(12) United States Patent
Nakatsuji et al.

(10) Patent No.: US 8,189,594 B2
(45) Date of Patent: May 29, 2012

(54) METHOD OF CONTROLLING HEADER COMPRESSION IN WIRELESS COMMUNICATION, WIRELESS BASE STATION, AND TRANSMITTER

(75) Inventors: Mitsuru Nakatsuji, Kawasaki (JP);
Shinya Hatakeyama, Kawasaki (JP);
Yasushi Miyagawa, Yokohama (JP);
Hideyuki Tsutsumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 331 days.

(21) Appl. No.: 12/604,274

(22) Filed: Oct. 22, 2009

(65) Prior Publication Data
US 2010/0039942 A1    Feb. 18, 2010

Related U.S. Application Data

(63) Continuation of application No. PCT/JP2007/059776, filed on May 11, 2007.

(51) Int. Cl.
*H04L 12/26* (2006.01)
*H04J 3/18* (2006.01)

(52) U.S. Cl. ........................ 370/394; 370/477
(58) Field of Classification Search ........................ None
See application file for complete search history.

(56) References Cited

U.S. PATENT DOCUMENTS

| | | | | |
|---|---|---|---|---|
| 7,286,536 | B2 * | 10/2007 | Greis et al. | 370/392 |
| 7,733,867 | B2 * | 6/2010 | Conner et al. | 370/394 |
| 2002/0001298 | A1 | 1/2002 | Tourunen | |
| 2002/0038385 | A1 * | 3/2002 | Kalliokulju | 709/247 |
| 2002/0058474 | A1 * | 5/2002 | Thompson et al. | 455/3.01 |
| 2002/0097723 | A1 * | 7/2002 | Tourunen et al. | 370/392 |
| 2003/0007512 | A1 | 1/2003 | Tourunen | |
| 2004/0033801 | A1 | 2/2004 | Yi | |
| 2004/0088642 | A1 * | 5/2004 | Imura et al. | 714/776 |
| 2004/0136377 | A1 | 7/2004 | Miyazaki | |
| 2004/0136380 | A1 | 7/2004 | Ido | |
| 2005/0195750 | A1 * | 9/2005 | Le et al. | 370/252 |
| 2007/0058679 | A1 * | 3/2007 | Pelletier et al. | 370/477 |
| 2008/0151901 | A1 * | 6/2008 | Yang et al. | 370/394 |

FOREIGN PATENT DOCUMENTS

| | | |
|---|---|---|
| JP | 2000-083036 | 3/2000 |
| JP | 2002-094554 | 3/2002 |
| JP | 2004-502361 | 1/2004 |
| JP | 2004-187326 | 7/2004 |
| JP | 2004-533792 | 11/2004 |
| JP | 2005-057323 | 3/2005 |
| JP | 2005-522944 | 7/2005 |
| JP | 2006-287284 | 10/2009 |

OTHER PUBLICATIONS

3GPP TS25.321 V7.3.0 (Dec. 2006) "Technical Specification Group Radio Access Network; Medium Access Control (MAC) Protocol Specification (Release 7)".
3GPP TS25.322 V7.2.0 (Sep. 2006) "Technical Specification Group Radio Access Network; Radio Link Control (RLC) Protocol Specification (Release 7)".
3GPP TS25.323 V7.3.0 (Dec. 2006) "Technical Specification Group Radio Access Network; Packet Data Convergence (PDCP) Specification (Release 7)".
RFC 3095 "RFC 3095—Robust Header Compression (ROHC); Framework and Four Profiles; RTP, UDP, ESP, and Uncompressed" (Jul. 2001).

* cited by examiner

*Primary Examiner* — Min Jung
(74) *Attorney, Agent, or Firm* — Fujitsu Patent Center

(57) ABSTRACT

The wireless base station notifies the missing to the transmitter upon detection of missing of a data segment received from the transmitter, and the transmitter controls the header compression state of the data segment addressed to the wireless terminal upon the reception of the notification of the missing.

19 Claims, 21 Drawing Sheets

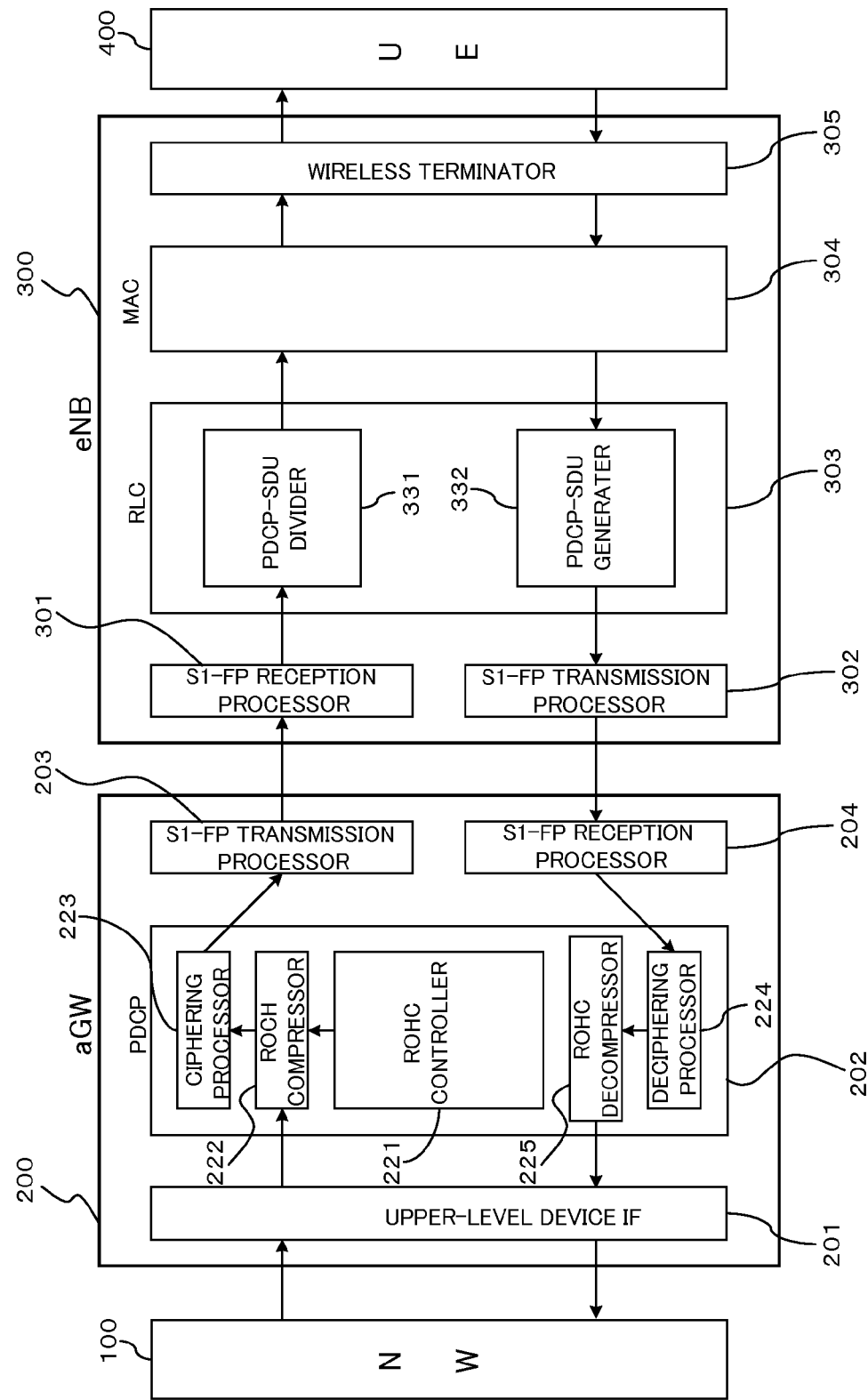

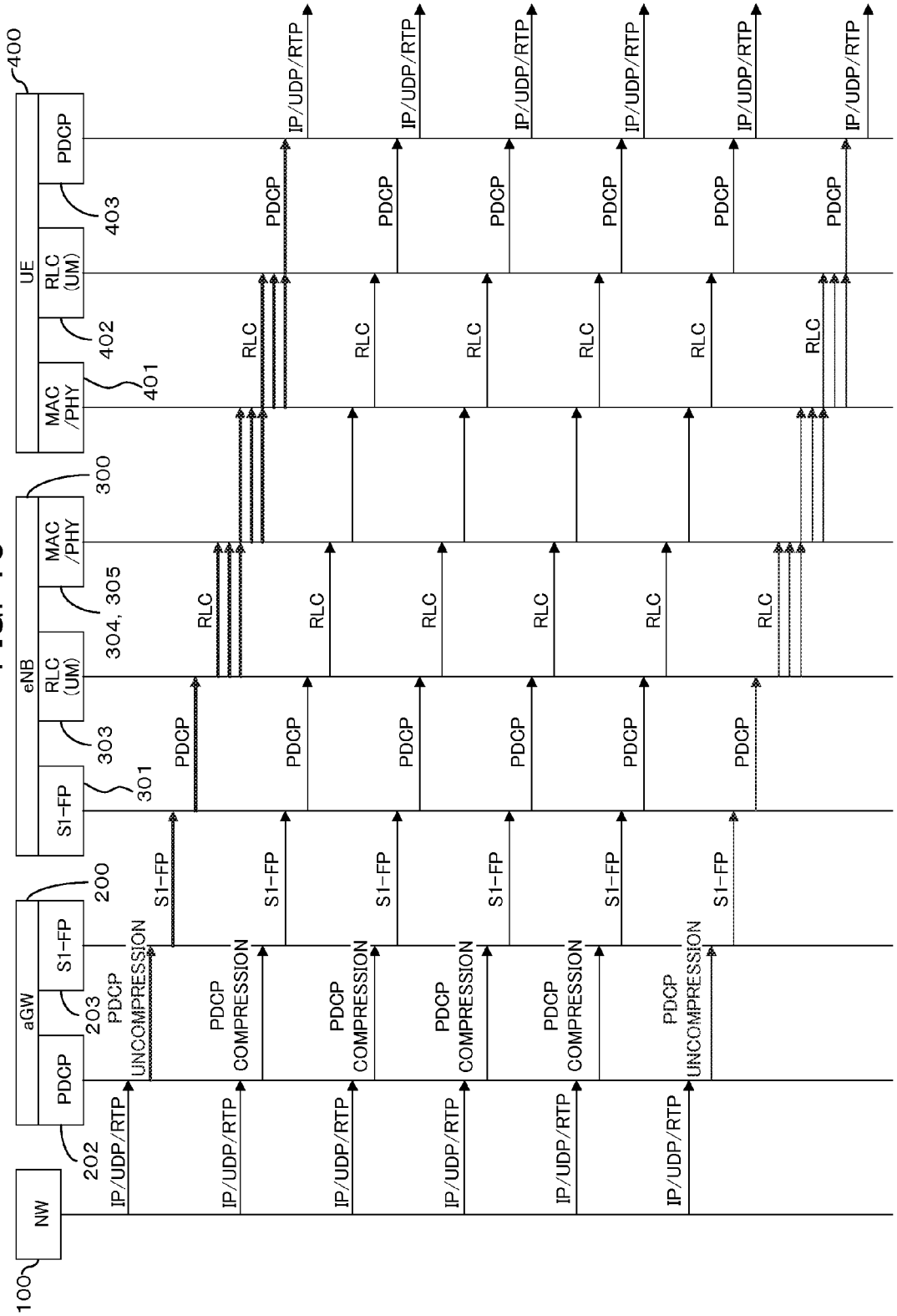

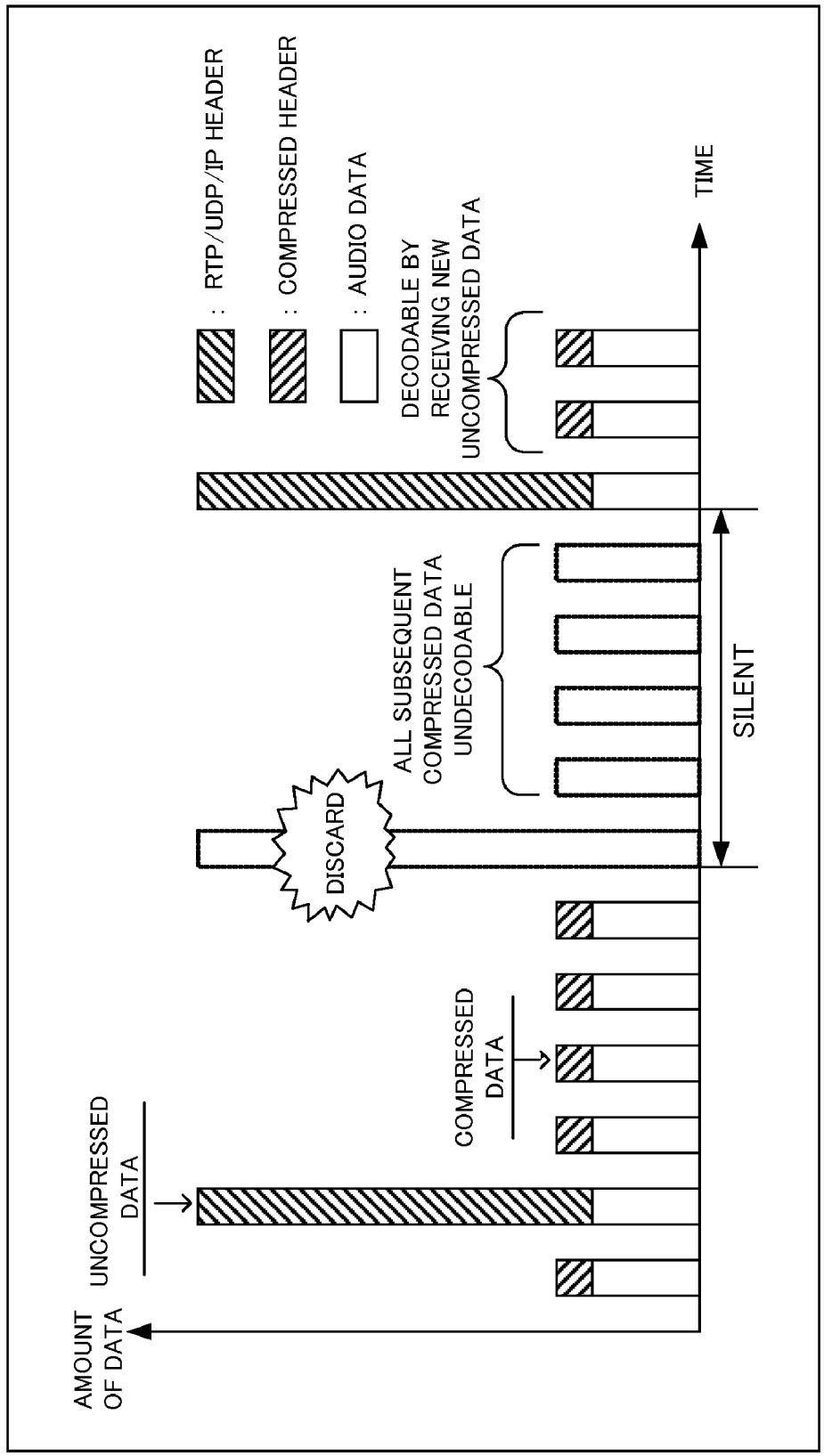

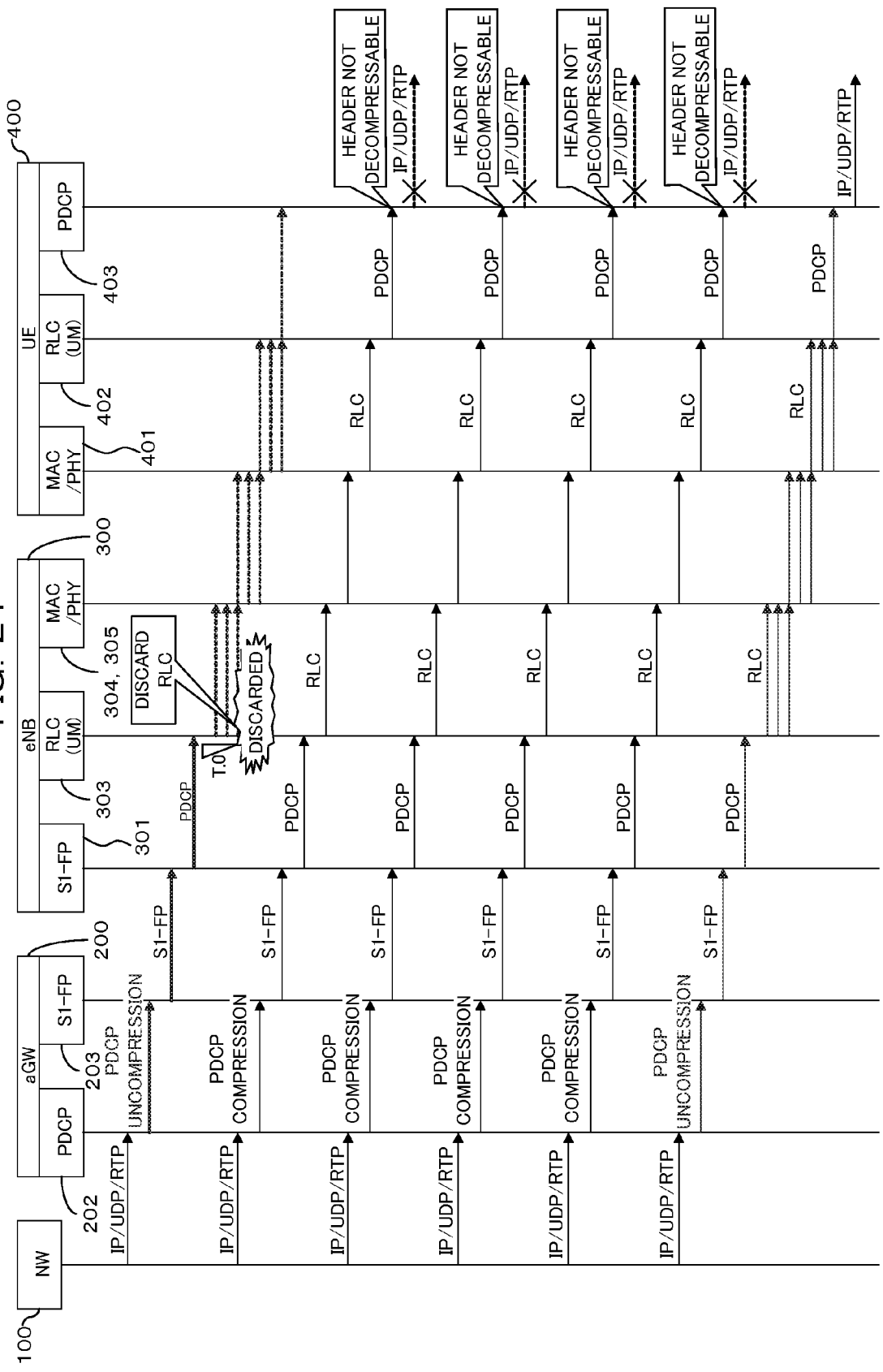

METHOD OF CONTROLLING HEADER COMPRESSION IN WIRELESS COMMUNICATION, WIRELESS BASE STATION, AND TRANSMITTER

CROSS-REFERENCE TO RELATED APPLICATION

This application is a continuation Application of a PCT international application No. PCT/JP2007/59776 filed on May 11, 2007 in Japan, the entire contents of which are incorporated by reference.

FIELD

The embodiments discussed herein are related to a method of controlling header compression in wireless communication, a base station, and a transmitter.

BACKGROUND

S3G (Super 3G) is a standard the standardization organization 3GPP is now promoting international standardization as LTE (Long Term Evolution) in an effort to achieve a significant improvement in performance of the third-generation (3G) cellular system. The standard achieves high-speed transmission in mobile communication, and provides an advanced service environment such as high-speed video distribution. Furthermore, it is expected as a system to provide effective frequency utilization.

FIG. 10 illustrates a configuration of an S3G system.

Each wireless base station (E-UTRAN Node-B, abbreviated as eNB) has a function as a wireless base station (Node-B) in generations before S3G and a function as a radio network controller (RNC).

An access gateway (aGW) manages and controls a plurality of eNBs, and relays transmission between an user equipment (UE) and an inter access system anchor (IASA). The IASA has a router function and is connected to an IP Multimedia Subsystem (IMS). It is also connected to a home subscriber service (HSS) for storing subscriber profiles.

Since this system is upgraded from an existing circuit-switched mobile system until a conventional 3G system including voice communication to an all-IP mobile system, the VoIP is also applied to voice communication, which can be subjected to packet communication together with data communication.

FIG. 11 illustrates a protocol stack that transforms real-time data (such as voice communication call) in the S3G system into IP packets. Table 1 lists a functional overview of each protocol.

TABLE 1

Protocol overview

| Protocol | Functional overview | Regulation |
| --- | --- | --- |
| PHY/Ether | Physical layer/Ethernet(R) These are defined as basic interfaces for LAN/WAN, and either Physical layer or Ethernet(R), or varying combinations of both can be used. | IEEE802-related regulation |
| MAC | Medium Access Control Performs, for example, scheduling, priority control, error correction by HARQ (Hybrid Automatic Repeat request), and transport format selection. | TS.25.321 |
| RLC | Radio Link Control Error correction by ARQ In-sequence delivery of an upper-layer PDU (Protocol Data Unit) | TS.25.322 |
| GRE | Generic Routing Encapsulation Used for encapsulation of other protocols. | RFC2784 |
| S1-FP | S1 Interface Frame Packet A Protocol applied to the interface (S1 Interface) between an aGW and an eNB. The detail of the current protocol field is undefined. | |
| PDCP | Packet Data Convergence Protocol Performs header compression (ROHC: RObust Header Compression) of TCP/IP. | TS.25.323 |
| MIP | Mobile IP Manages correspondence between a Home Address (HoA) used by a Mobile Node (MN) in the home link (the network to which the MN originally belongs) and a Care of Address (CoA) used in an external link (a visited network by the MN). | RFC3220 (IPv4) RFC3775 (IPv6) |
| IPSec | IP Security protocol Ensures security (for encryption) in the IP layer. A transport mode and a tunnel mode are available. | RFC2002, 2406 |
| IP | Internet Protocol Layer 3 function used in the Internet. Provides a data routing function. | RFC791 |
| UDP | User Datagram Protocol A connectionless transmission protocol Low reliability but light-load processing. | RFC768 |
| RTP | Real-time Transport Protocol Provides a framework for transmission of real-time media such as audio and video. Uses a profile or a payload format depending on application. | RFC1889 |
| RTCP | RTP Control Protocol Controls a session for data transmission in RTP (Real-time Transport Protocol), checks data transmission, and transmits information between a sender and a receiver. | RFC1889 |

Real-time data is transmitted using a RTP/UDP/IP header.

The RTP/UDP/IP header constitutes a significant overhead for audio data, and attachment of the header without modification leads to low communication efficiency. Furthermore, line quality in the wireless zone is lower than that in the cable zone, and the wireless zone has narrow bandwidth. This requires further header compression compared to the cable zone.

Thus, a PDCP protocol is applied between an aGW and a UE to perform Robust Header Compression (ROHC) for an RTP/UDP/IP header. The wireless zone can increase the utilization efficiency of transmission (wireless) bandwidth.

The ROHC performed by the PDCP protocol has three compression states; IR, FO, and SO depending on the compression level (see Table 2).

TABLE 2

Compression states of ROHC

| | | |
|---|---|---|
| (1) | Initialization and Refresh (IR) | Initialization state: Transmits uncompressed full header. |
| (2) | First Order (FO) | Header updating: Transmits parts such as a destination address of which the value ordinarily does not vary, but varies by a change in session. |
| (3) | Second Order (SO) | Operation state: Transmits only minimum field. |

In the ROHC, three transmission modes (U mode, O mode, and R mode) are defined (see Table 3), and these modes can mutually transfer from one to another during communication.

TABLE 3

Transmission modes of ROHC

| | |
|---|---|
| U-mode<br>No feedback from<br>UE (decompressor) | (1) Surely delivers data to UE by sending the same data several times (optimistic approach).<br>(2) Makes a transition to a lower state periodically (timeout).<br>(3) Makes a transition to a lower state if the compression pattern is changed by a significant change in a header (need for updates). |
| O-mode<br>Irregular feed<br>back from UE<br>(decompressor) | (1) The ideas of "optimistic approach" and "need for update" are the same as those of the U-mode.<br>(2) Uses no Timeout.<br>(3) Makes a transition to another state after recognition of a reception state of UE (decompressor) by feedback from the UE (decompressor). |
| R-mode<br>Regular feedback<br>from UE<br>(decompressor) | (1) Makes a transition to an upper state using only feedback from UE (decompressor), without using the optimistic approach (secure reference).<br>(2) Makes a transition to a lower state by "need for updates" or by error reception notification from UE (decompressor). |

These three transmission modes each have the three compression states (IR, FO, and SO) illustrated in Table 2 (see FIG. 12).

Patent Reference 1: Japanese Translation of PCT international application No. 2004-533792
Patent Reference 2: Japanese Translation of PCT international application No. 2004-502361
Patent Reference 3: Japanese Translation of PCT international application No. 2005-522944
Non-Patent Reference 1: 3GPP (TM) TS25.321
Non-Patent Reference 2: 3GPP (TM) TS25.322
Non-Patent Reference 3: 3GPP (TM) TS25.323
Non-Patent Reference 4: RFC3095

Preferably, the transmission modes and the header compression states above are selectively applied depending on a system and a service. For example, since a wireless band for voice communication is limited in a mobile system, an improvement in the utilization efficiency is indispensable and transmission of useless data must be avoided as much as possible.

In that case, for example, in the U mode, multiple transmission of the same data segment by "optimistic approach" should be avoided as much as possible because it causes the utilization efficiency to decrease. In addition, since header information transmitted in the IR state or the FO state must be minimized, transition from a lower state to an upper state (IR to FO, FO to SO, or IR to SO) is preferably made immediately. On the contrary, the timer value for transition from an upper state to a lower state (SO to FO, FO to IR, or SO to IR) is preferably large.

The O mode or the R mode, which needs a response from UE, affects the upstream band. Furthermore, the round-trip time is long because of notification from a UE to an aGW, which may not be available for real-time voice communication. For example, when a reception error at a UE 400 is notified to an aGW (an ROHC compressor), selection of transition of the compression state is delayed in response to the delayed arrival of the notification to the aGW, which may cause needless wireless transmission in the downstream direction.

(Application Example of ROHC)

When ROHC processing is applied to voice communication in a mobile system, only the U mode, which does not perform feedback from a UE to an aGW, is used, and state transition in the ROHC processing is preferably limited to only the transition between the IR state and the SO state, as illustrated in FIG. 13.

Specifically, the transition from the IR state to the SO state (an upper state) is performed, for example, by transmission of one packet of header-uncompressed data (hereinafter referred to uncompressed data). The transition from the SO state to the IR state (a lower state) is performed, for example, at the end of a timer value (100 ms).

FIG. 14 illustrates a header format of IP/UDP/RTP. As illustrated in FIG. 14, all the headers (40 to 100 bytes) are transmitted in the IR state, whereas only the sequence number (SN, 2 bytes) in the RTP header is transmitted in the SO state.

FIG. 15 illustrates a transmission image (direction from an aGW to a UE) of audio packets in this exemplary application. In the drawing, the audio packets are transmitted at constant intervals (20 ms), and uncompressed data segments are transmitted at intervals of 100 ms.

FIGS. 16 and 17 illustrate examples of packet formats after processing in function blocks of two nodes. FIGS. 16 and 17 illustrate exemplary formats in an uncompressed condition and in a compressed condition, respectively.

In both cases, ciphering is performed from the PDCP field to the AMR field by a PDCP processor of an aGW, and deciphering is performed by the UE. If a packet size exceeds the RLC-PDU length in cases of RCL processing in an eNB, the packet is divided into multiple RLC protocol data units (RLC-PDUs). If a space is generated by the division, padding data is inserted. In the example illustrated in FIG. 16, the audio packet is divided into three RLC-PDUs in the uncompressed condition. In the example of the compressed condition illustrated in FIG. 17, the audio packet is transmitted in one packet without division.

FIG. 18 illustrates a system configuration of the ROHC processing applied to voice transmission in the above mobile system. FIG. 19 illustrates a processing sequence in the system. In FIG. 19, however, only the processing sequence for the downstream (from the NW to the UE) communication is illustrated.

The system illustrated in FIG. 18 includes, for example, an upper-level network device 100 (hereinafter also referred to as NW 100) that constitutes an upper-level network (NW) equivalent to an IASA illustrated in FIG. 10, an aGW 200, an eNB 300, and a UE 400.

The aGW 200 includes an upper-level device interface (IF) 201, a PDCP processor 202, an S1-FP transmission processor 203, and an S1-FP reception processor 204. The eNB 300 includes an S1-FP reception processor 301, an S1-FP transmission processor 302, an RLC processor 303, a MAC processor 304, and a wireless terminator (a physical layer (PHY) processor) 305. Hereinafter, the MAC processor and the PHY processor may be collectively called MAC/PHY processor.

Furthermore, the PDCP processor 202 of the aGW 200 includes an ROHC controller 221, an ROHC compressor 222, a ciphering (encryption) processor 223, a deciphering (decryption) processor 224, and an ROHC decoder (ROHC decompressor) 225. The RLC processor 303 of the eNB 300 includes a PDCP-SDU divider (an RLC-PDU generator) 331 and a PDCP-SDU generator (an RLC terminator) 332.

The UE 400 includes, for example, a MAC/PHY processor 401, an RLC processor 402, and a PDCP processor 403 as illustrated in FIG. 18, focusing attention on downstream functions.

In the system having such a configuration, first, downstream (direction from the NW 100 to the UE 400) processing for audio data (the processing sequence illustrated in FIG. 19) is described. In the aGW 200, audio data (AMR/RTP/UDP/IP packet data) received from the upper-level network through the upper-level device interface 201 is applied to the PDCP processor 202. After PDCP protocol processing (ROHC processing) by the ROHC compressor 222, the data is ciphered (encrypted) by the ciphering processor 223, and then is transmitted to the S1-FP transmission processor 203.

The S1-FP transmission processor 203 converts the protocol fields of the packet received from the PDCP processor 202 (the ciphering processor 223) into a protocol (S1-FP) used in the inter-device IF between the aGW 200 and the eNB 300 (for example, attachment of an S1-FP header), and then transmits the packet to the eNB 300.

In the eNB 300, the S1-FP reception processor 301 receives the packet (the S1-FP packet) transmitted from the aGW 200 (the S1-FP transmission processor 203), and then transmits the packet to the RLC processor 303, for example, after termination processing of the S1-FP header.

In the RLC processor 303, the PDCP-SDU divider (the RLC-PDU generator) 331 generates data of the RLC layer (RLC-PDU) from the received packet (the PDCP packet) transmitted from the S1-FP reception processor 301. In other words, the divider 331 divides the SDU (PDCP-SDU) of the received packet into RLC packets (RLC-PDUs) as needed, and then transmits them to the MAC processor 304.

The MAC processor 304 transmits the RLC packet (RLC-PDU) from the RLC processor 303 to the wireless terminator (the PHY processor) 305 after the required MAC processing at the MAC layer. The wireless terminator 305 generates a transmission wireless signal from the data that is subjected to such MAC processing, and then transmits the signal to the UE 400.

In the UE 400, the MAC/PHY processor 401 subjects the wireless signal received from the eNB 300 to required processing (termination processing) at the physical layer and the MAC layer, the RLC processor 402 subjects the signal to RLC termination processing, and then the PDCP processor 403 subjects the signal to deciphering processing and PDCP termination processing (for example, decompression processing) to decode the audio data (AMR/RTP/UDP/IP packet data).

On the contrary, the process of upstream audio data is the reverse of the above process. Consequently, in the UE 400, the audio data to be transmitted is subjected to required processing in the PDCP, ciphering (encryption), and the MAC/PHY protocol, and then is transmitted to the eNB 300 by a wireless signal. The eNB 300 subjects the signal received from the UE 400 to required processing at the physical layer and the MAC layer in the wireless terminator 305 and the MAC processor 304, and then transmits the signal to the PDCP-SDU generator (the RLC termination processor) 332 in the RLC processor 303 to generate a PDCP packet (PDCP-SDU). The PDCP packet is transmitted to the aGW 200 after conversion into the inter-device IF protocol (S1-FP) in the S1-FP transmission processor 302.

In the aGW 200, the upstream data (the S1-FP packet) transmitted from the eNB 300 is received by the S1-FP reception processor 204, and then is transmitted to the PDCP processor 202 after converting into the inter-device IF protocol (PDCP). Then, the data is subjected to deciphering processing and ROHC decoding processing by the deciphering processor 224 and the ROHC decoder 225, respectively, in the PDCP processor 202, and then is transmitted to the NW 100 through the upper-level device IF 201.

As described above, header compression by the ROHC in PDCP leads to efficient utilization of a transmission line. However, as schematically illustrated in FIG. 20, for example, if missing of an uncompressed data segment occurs due to some factors at an intermediate node such as the eNB 300, compressed data segments cannot be decoded during a certain time until the UE 400 can receive the subsequent uncompressed data segment (in the meantime, silence occurs).

The reason is as follows. If a data segment, especially an uncompressed data segment is missing, the header of header-compressed data segments (compressed data segments) cannot be decompressed until the subsequent uncompressed data segment is received by the UE (the ROHC decompressor), in the header compression algorithm of the ROHC.

For example, in the RLC processor 303 of the eNB 300, for real-time data such as audio data, data residing for more than a predetermined time is discarded by an RLC discard function. The RLC processing has three modes: an AM mode, a UM mode, and a TM mode. The UM mode or the TM mode that does not require a response from the counterpart is applied to an audio packet. The RLC discard function operates in the UM mode.

Therefore, under congestion, discard by the function may occur. FIG. 21 illustrates such a case.

As illustrated in FIG. 21, when discard of an uncompressed data segment is generated by the RLC discard function in the RLC processor 303 of the eNB 300, the UE 400 cannot receive the uncompressed data segment (see the dotted arrow). For this reason, the UE 400 (the PDCP processor 403) cannot decompress the header of received compressed data segments until the subsequent uncompressed data segment can be normally received, so that audio data segments (AMR/RTP/UDP/IP packet data segments) cannot be decoded correctly. Compressed data segments that cannot be decoded are discarded by the UE 400.

If the UE 400 cannot receive normally an uncompressed data segment addressed to the UE 400 due to discard or missing of the data segment, for example, on the midway, such as the eNB 300, the UE 400 cannot decompress the compressed header of packet data (compressed data segments) to be subsequently received. This significantly precludes voice reproduction until the subsequent uncompressed data segment is received. The compressed data segments received by the UE 400 before this time are wastefully discarded, resulting in loss of the downstream wireless band (wireless resources).

SUMMARY (1) According to an aspect of the embodiments, a method includes a method of controlling header compression in wireless communication for a wireless communication system including a transmitter that controls header compression states of data segments addressed to a wireless terminal into a compressed or uncompressed state and that transmits the data segments, and a wireless base station that receives the data segments addressed from the transmitter to the wireless terminal and that transmits the data segments to the wireless terminal, wherein the wireless terminal decodes header-compressed data segments from the wireless base station, based on a received header-uncompressed data segment, the method including: the wireless base station performs missing notification to the transmitter when detecting the missing of the reception data segments from the transmitter, and the transmitter controls header compression states of the data segments addressed to the wireless terminal into an uncompressed state when receiving the missing notification.

(2) According to an aspect of the embodiments, an apparatus includes a wireless base station in a wireless communication system including a transmitter that transmits data segments after controlling header compression states of the data segments addressed to the wireless terminal into a compressed or uncompressed state, a wireless base station that receives the data segments addressed from the transmitter to the wireless terminal and transmits the data segments to the wireless terminal, wherein the wireless terminal decodes the header-compressed data segments from the wireless base station based on the received header-uncompressed data segment, the wireless base station including: a missing detecting unit that detects the missing of the reception data segments from the transmitter, and a missing notification controlling unit that performs the missing notification to the transmitter upon detection of the missing by the missing detecting unit.

(3) According to an aspect of the embodiments, an apparatus includes a transmitter in a wireless communication system including a transmitter that controls header compression states of the data segments addressed to a wireless terminal into a compressed or uncompressed state and that transmits the data segments, a wireless base station that receives the data segments addressed from the transmitter to the wireless terminal and that transmits the data segments to the wireless terminal, and the wireless terminal that decodes the header-compressed data segments from the wireless base station based on the received header-uncompressed data segment, the transmitter including: a receiving unit that receives the missing notification transmitted from the wireless base station when the wireless base station detects the missing of the data segments, and a controlling unit that controls the header compression states of the data segments addressed to the wireless terminal into an uncompressed state when the receiving unit receives the missing notification.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 18 is a function block diagram of two nodes that configure the S3G system illustrated in FIG. 10.

FIG. 19 is a sequence view illustrating an operation (a method of controlling header compression) of the S3G system illustrated in FIGS. 10 and 18.

FIG. 20 is a schematic view illustrating a transmission image of an audio packet (in the direction from an aGW to a UE) for illustrating problems of the processing sequence illustrated in FIG. 19.

FIG. 21 is a sequence view illustrating problems of the processing sequence illustrated in FIG. 19.

DESCRIPTION OF EMBODIMENTS

Hereinafter, various embodiments will be described with reference to the accompanying drawings. However, it should be noted that the embodiments explained below are only examples to aid the understanding of the gist of the embodiments and that there is no intention to exclude the various modifications and the application of another techniques that are not clarified in the following embodiments. Therefore, individual embodiments can be modified (for example combined with one another).

[1] Overview

In the embodiments, an eNB (a wireless base station), which is an intermediate node between an aGW provided with an ROHC compressor function and a UE provided with an ROHC decompressor function, can detect an error (discard or missing) of an audio packet (PDCP-PDU) addressed to the UE by an RLC discard function, for example. Upon detecting the error, the eNB notifies generation of error of the PDCP-PDU to the aGW, which is the end node of the PDCP, and causes the aGW to lower a header compression level of the ROHC (from SO to IR or from FR to IR). Hence, a time period during which compressed data segments cannot be decompressed (decoded), that is, the silence period at the UE can be reduced, resulting in an improvement in quality of real-time communication such as voice communication.

Specifically, the eNB corresponds to an intermediate node in the communication path between the aGW and the UE, and can provide feedback on error generation notification to the aGW in an early stage, so that the aGW can reflect the notification to the PDCP compression control of the ROHC. In other words, the aGW can relieve audio data that was uncompressed and discarded at the UE by changing the compression state of the ROHC to the IR state and transmitting an uncompressed data segment, upon receiving the error generation notification.

[2] Precondition

Figure 13:
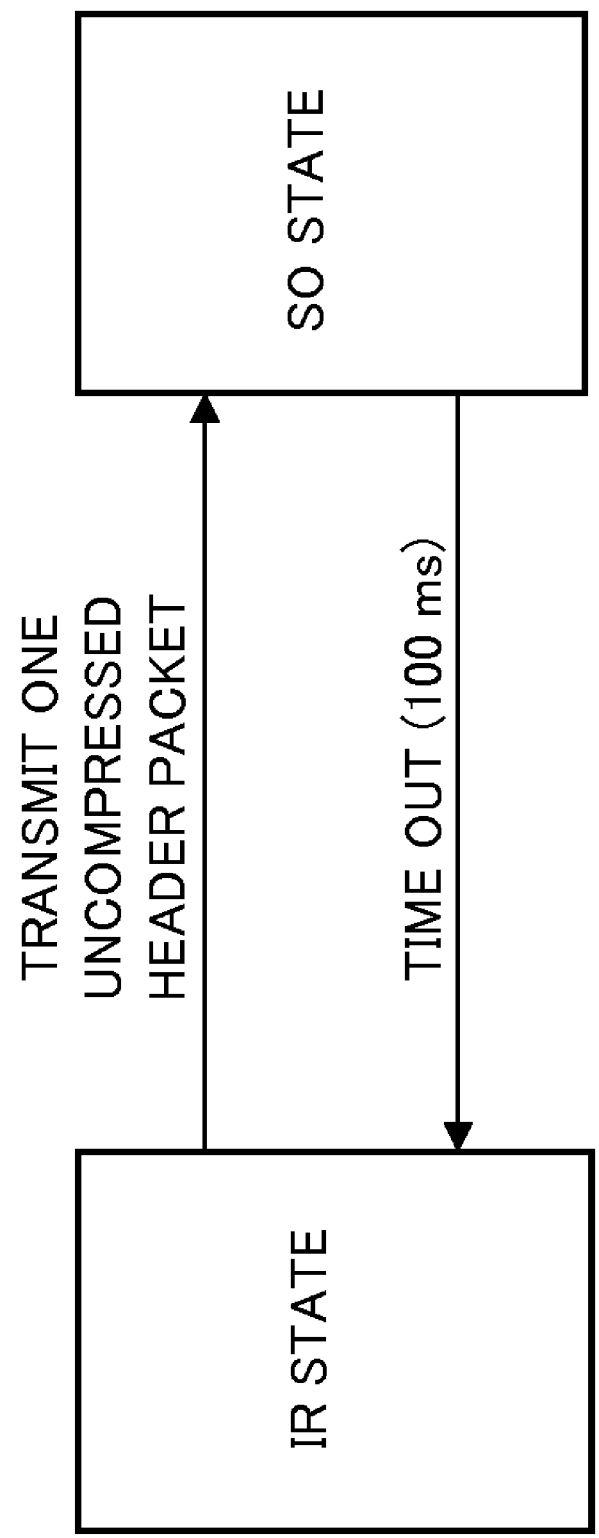
FIG. 13 is a schematic view illustrating state transition of ROHC in the U mode.

In the embodiment described below, for simplification of explanation, only the U-mode, which does not provide feedback from a UE to an aGW, is used, and it is assumed that state transition of ROHC processing is only state transition between the IR state and the SO state, as illustrated in FIG. 13. In other words, it is assumed that a downstream packet (an audio packet) from the aGW to the UE is either a header-uncompressed data segment (an uncompressed data segment) or a header-compressed data segment (a compressed data segment).

In addition, transition from the IR state to the SO state (upper state) while missing of a downstream packet does not occur (normal condition) is performed, for example, by transmission of one uncompressed data packet. On the other hand, transition from the SO state to the IR state (lower state) is performed, for example, at the end of a timer value (100 ms).

Figure 14:
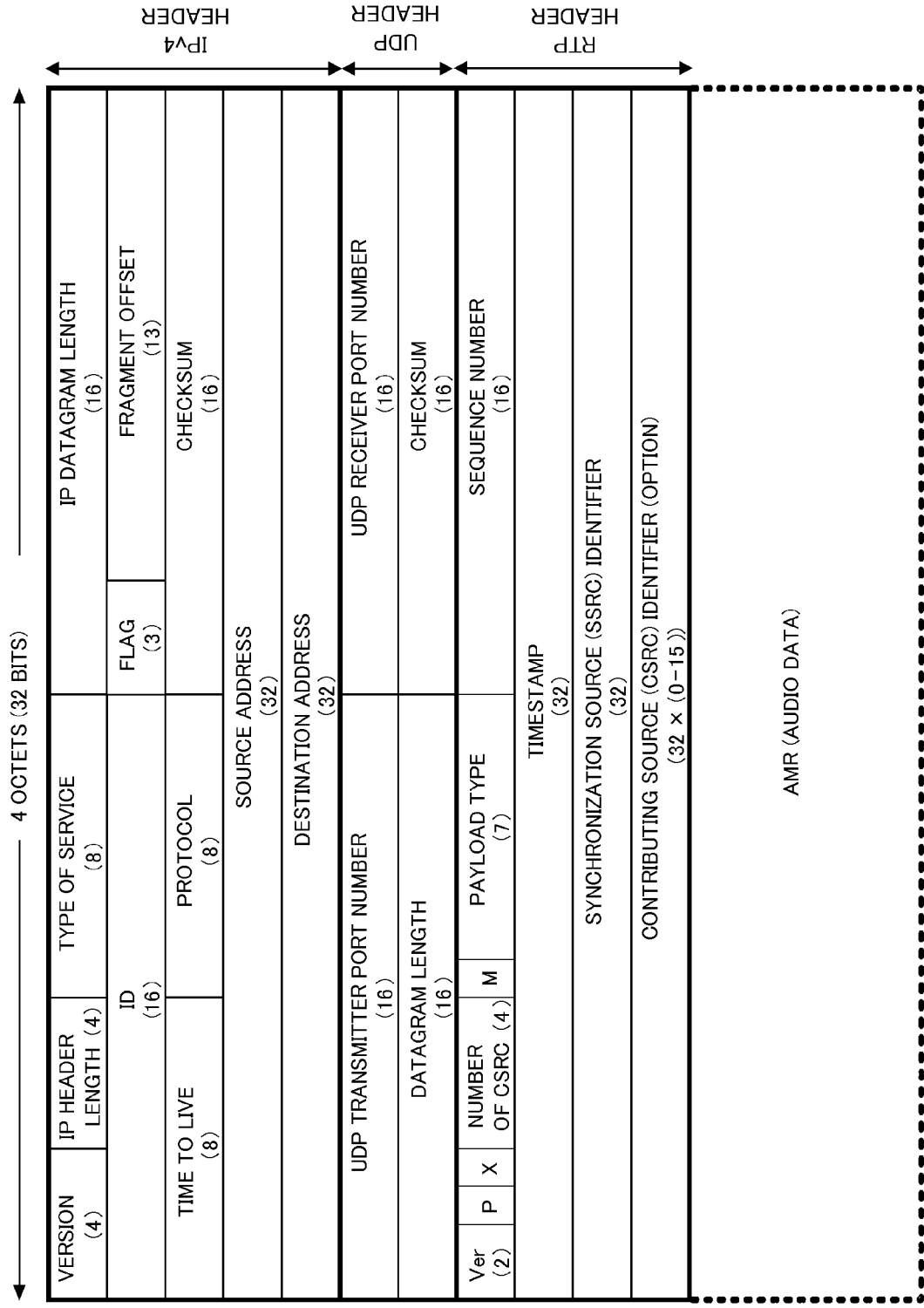
FIG. 14 is a schematic view illustrating an IP/UDP/RTP header format.

Furthermore, the IP/UDP/RTP header has the same format as that illustrated in FIG. 14. All the headers (40 to 100 bytes) are transmitted in the IR state, whereas only the sequence number (SN, 2 bytes) in the RTP header is transmitted in the SO state.

Figure 15:
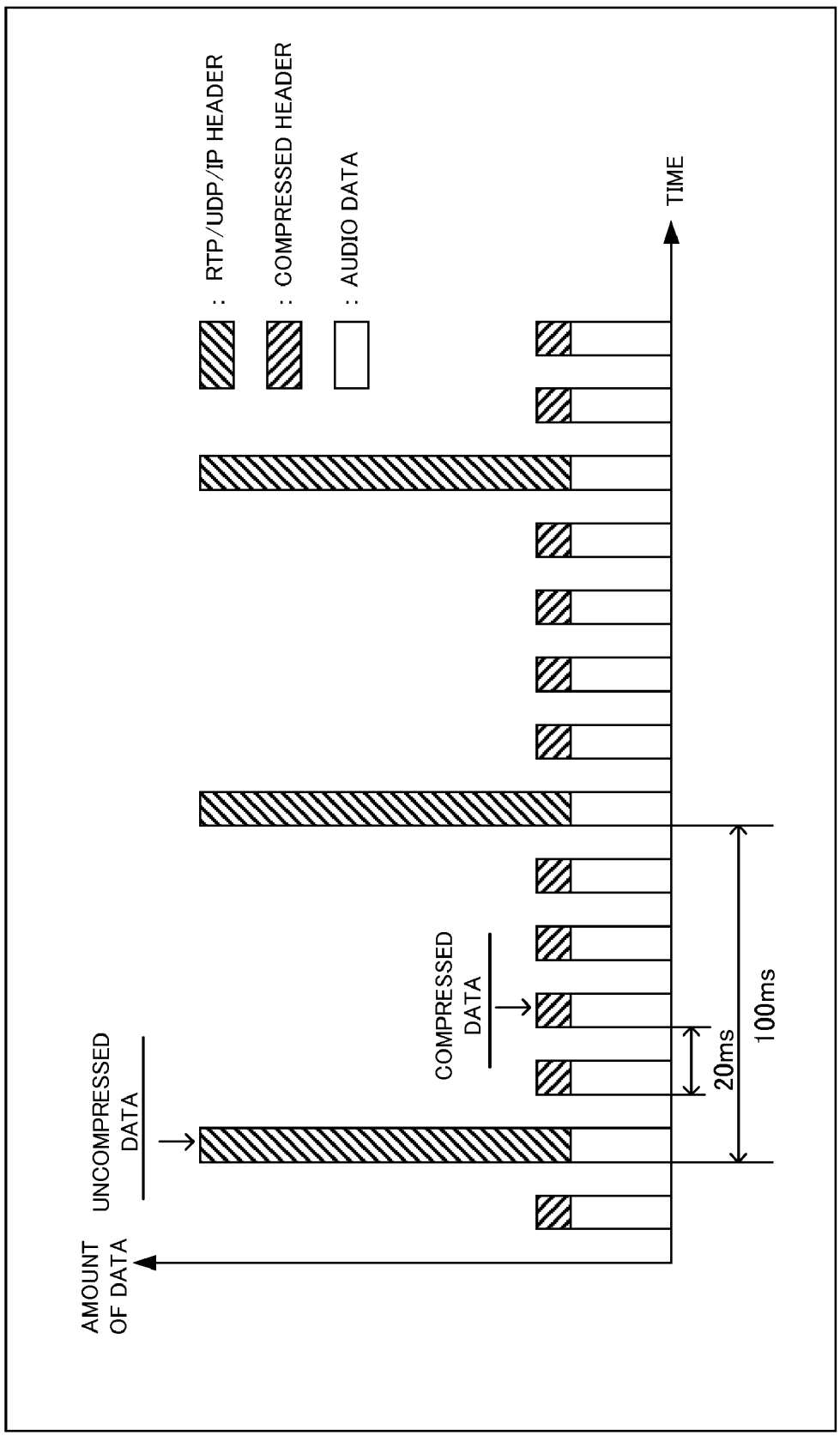
FIG. 15 is a schematic view illustrating a transmission image of an audio packet (in the direction from an aGW to a UE).
Figure 16:
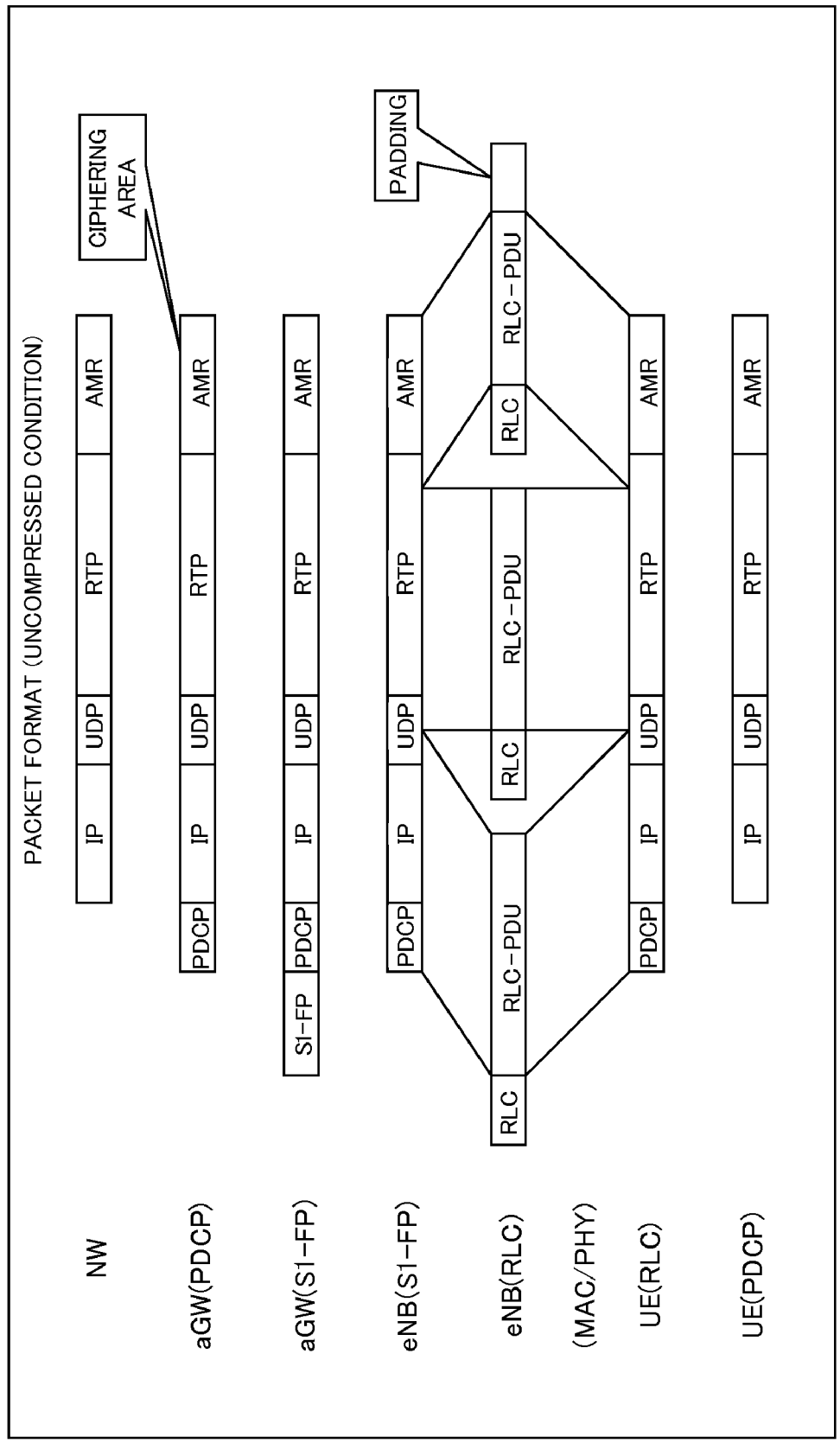
FIG. 16 is a schematic view illustrating a packet format (uncompressed condition) in the S3G system illustrated in FIG. 10.
Figure 17:
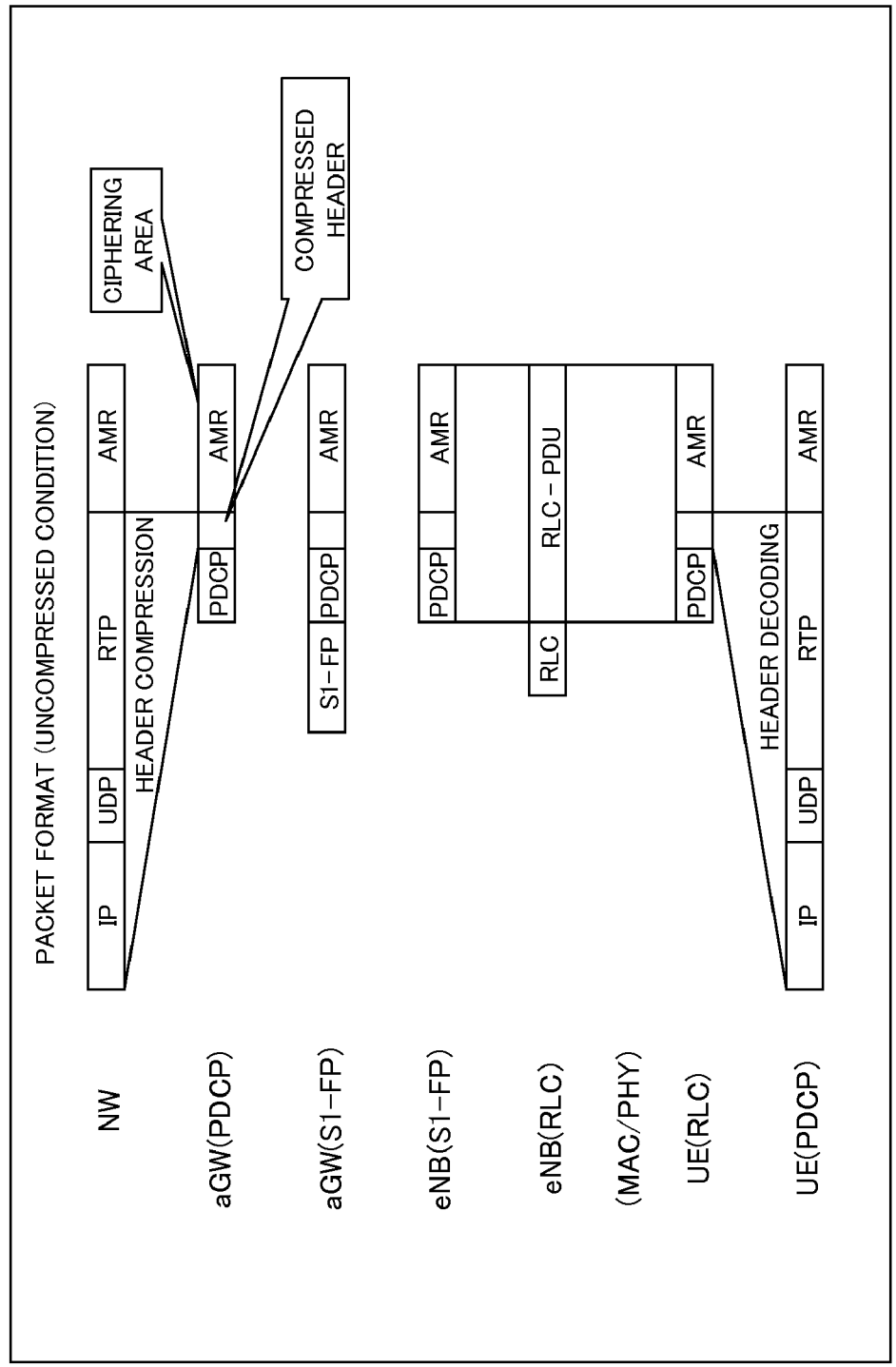
FIG. 17 is a schematic view illustrating a packet format (compressed condition) in the S3G system illustrated in FIG. 10.

Audio packets (the direction from the aGW to the UE) are transmitted as illustrated in the image of FIG. 15. In other words, it is assumed that audio packets are transmitted at constant intervals (20 ms), and uncompressed data segments are transmitted at intervals of 100 ms. The packet formats in the uncompressed condition and the compressed condition are basically the same as those illustrated in FIGS. 16 and 17, respectively.

In the following description, the error of a downstream packet (discard or missing) is often called simply "discard", which also includes the meaning "missing".

[3] First Embodiment

Figure 1:
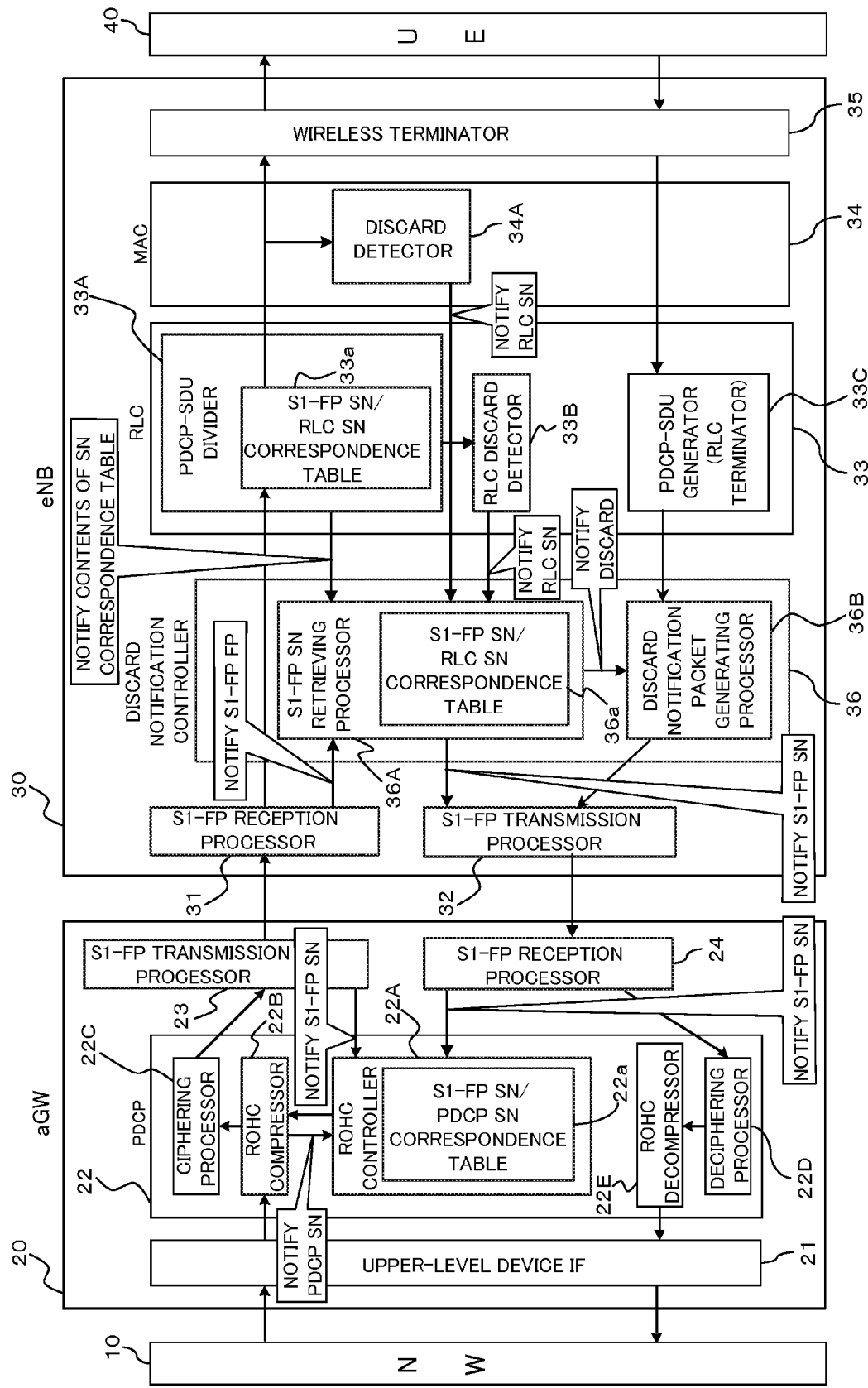
FIG. 1 is a block diagram illustrating a structure of a wireless communication system according to a first embodiment.
Figure 10:
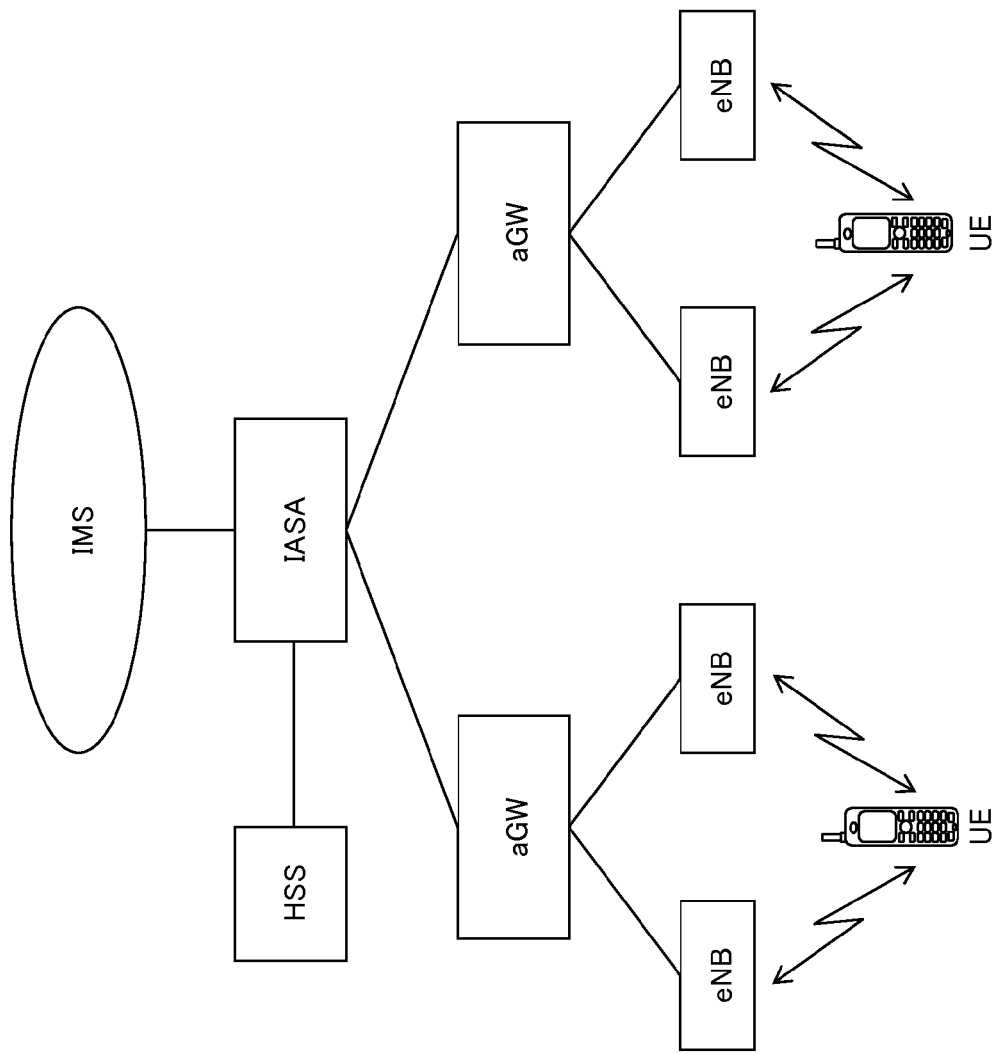
FIG. 10 is a block diagram illustrating an S3G system.
Figure 11:
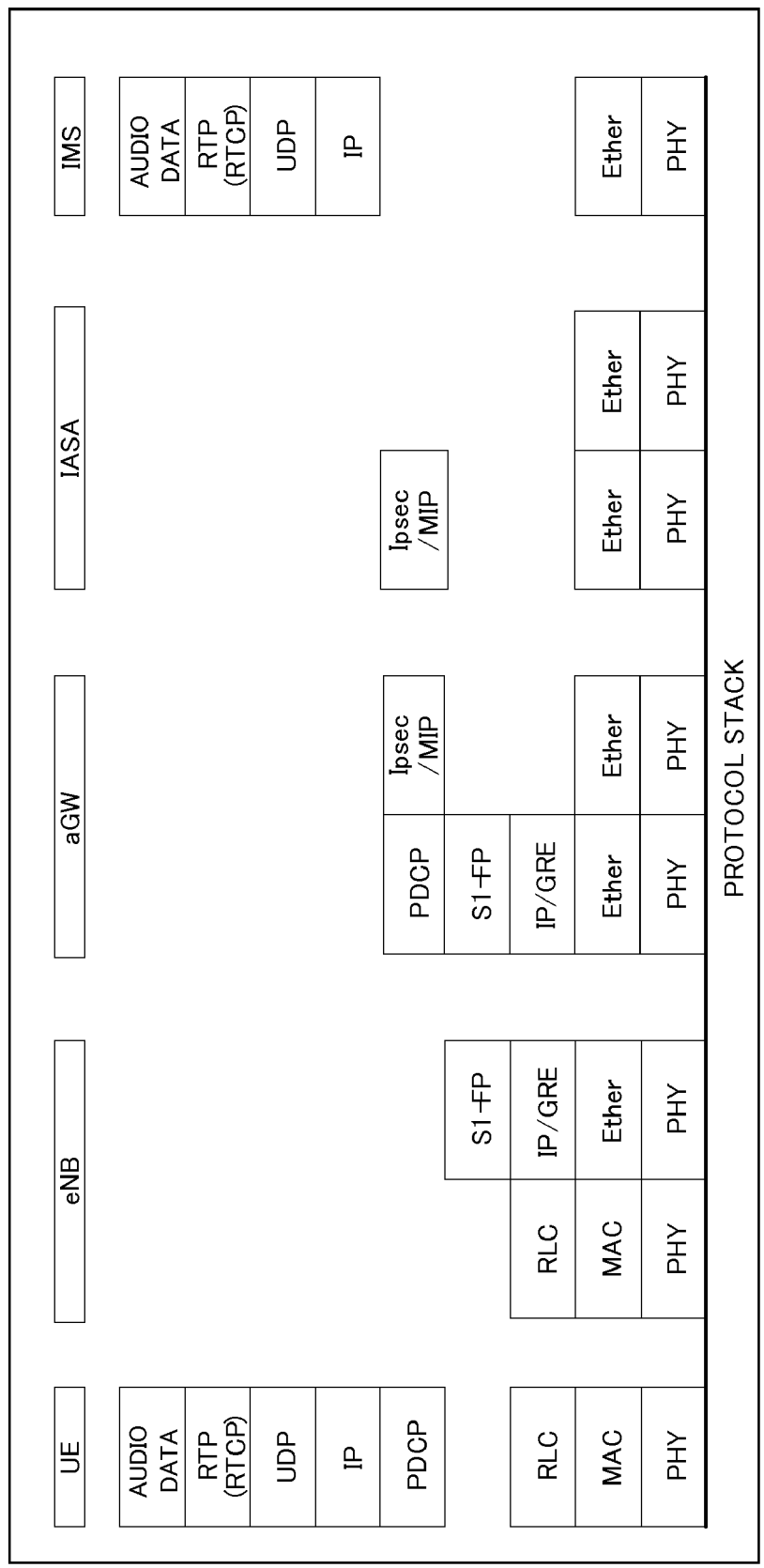
FIG. 11 is a schematic view illustrating a protocol stack that transforms real-time data (such as voice communication call) in the S3G system into IP packets.
Figure 12:
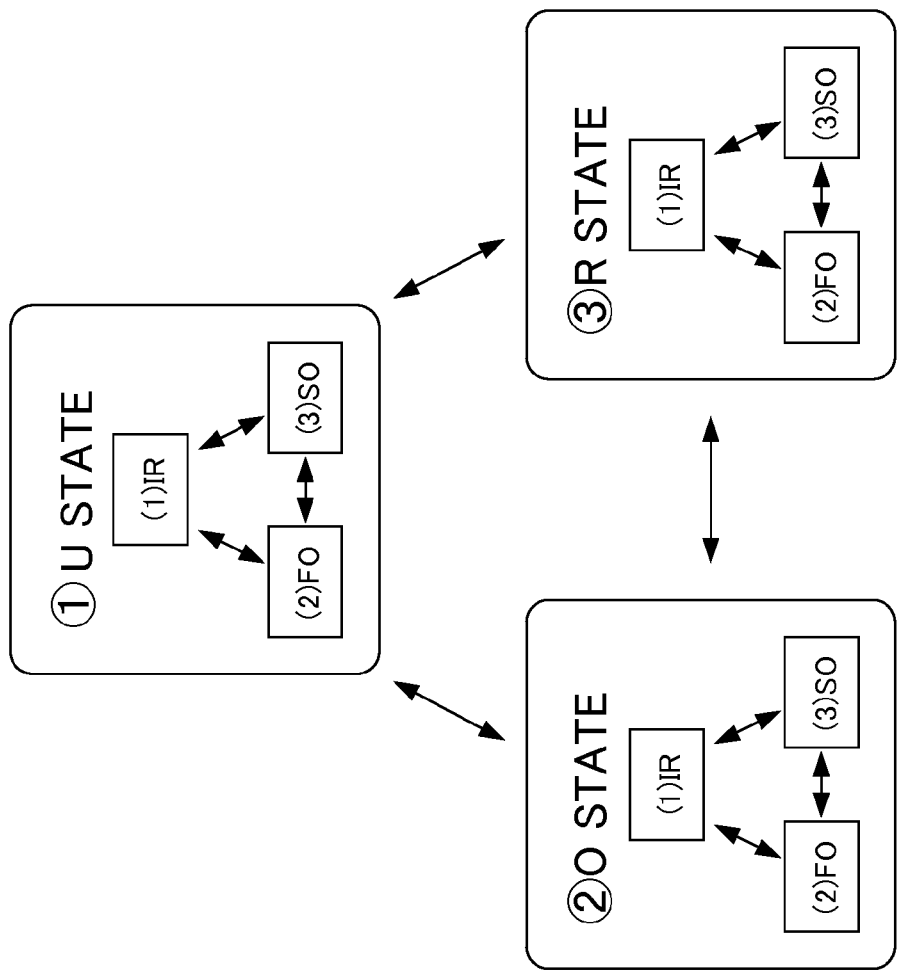
FIG. 12 is a schematic view illustrating relationship between compression states and mode transition of ROHC.

FIG. 1 is a block diagram illustrating a structure of a wireless communication system according to the first embodiment. The wireless communication system illustrated in FIG. 1, like the system illustrated in FIG. 18, also includes an upper-level NW device 10 (hereinafter also referred to as an NW 10) that configures an upper-level network (NW), and corresponds to, for example, IASA illustrated in FIG. 10, an aGW 20, an eNB 30, and a UE 40.

The system illustrated in FIG. 1 includes the aGW 20 as a transmitter that (adaptively) controls the header compression states of real-time data segments (downstream packets) such as audio data segments addressed to the UE 40 to a compressed or uncompressed state and transmits the data segments, the eNB 30 as a wireless base station that receives data addressed from the aGW 20 to the UE 40 and transmits the data segments to the UE 40, and the UE 40 as a wireless terminal that decodes header-compressed data segments from the eNB 30 based on a received header-uncompressed data segment.

The aGW 20 includes an upper-level device interface (IF) 21, a PDCP processor 22, an S1-FP transmission processor 23, and an S1-FP reception processor 24. The eNB 30 includes an S1-FP reception processor 31, an S1-FP transmission processor 32, an RLC processor 33, a MAC processor 34, a wireless terminator (physical layer (PHY) processor) 35, and a discard notification controller 36. In the following description, the MAC processor and the PHY processor may be collectively called MAC/PHY processor.

The PDCP processor 22 of the aGW 20 includes an ROHC controller 22A provided with a correspondence table 22a that matches the sequence numbers (SNs) in S1-FP, which are described below, and SNs in PDCP, an ROHC compressor 22B, a ciphering (encryption) processor 22C, a deciphering (decoding) processor 22D, and an ROHC decoder (ROHC decompressor) 22E.

The RLC processor 33 includes a PDCP-SDU divider (an RLC-PDU generator) 33A provided with a correspondence table 33a that matches the sequence numbers (SNs) in S1-FP, which are described below, and SNs in RLC, an RLC discard detector 33B, and a PDCP-SDU generator (an RLC terminator) 33C. The MAC processor 34 includes a discard detector 34A.

The discard notification controller 36 of the eNB 30 includes an SN retrieving processor 36A that is provided with a correspondence table 36a that matches sequence numbers (SNs) in S1-FP, which are described below, and SNs in RLC, and a discard notification packet generating processor 36B.

Figure 3:
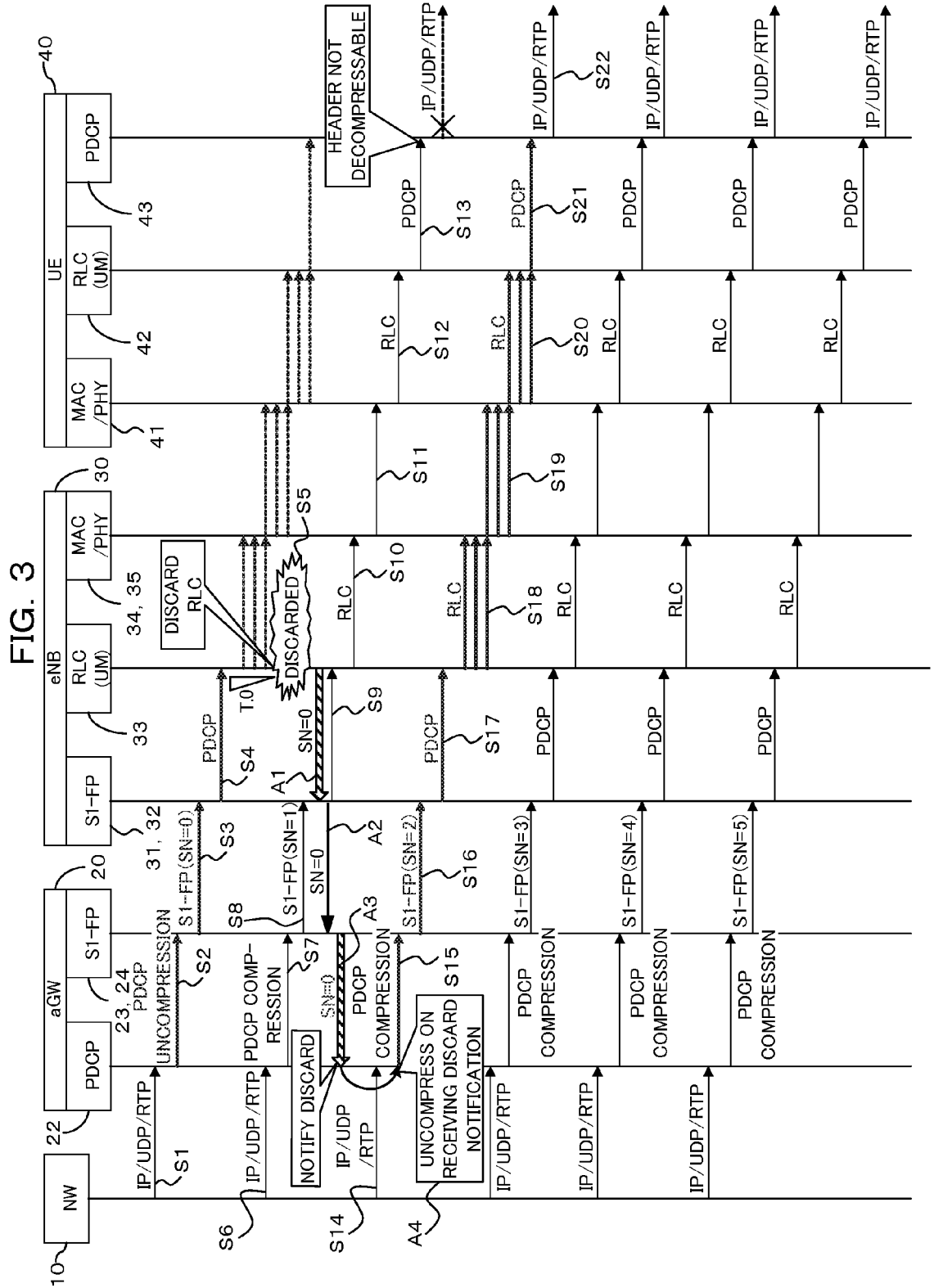
FIG. 3 is a sequence view illustrating an operation (a method of controlling header compression) of the wireless communication system illustrated in FIG. 1.

The UE 40 includes, for example, a MAC/PHY processor 41, an RLC processor 42, and a PDCP processor 43 as illustrated in FIG. 3, focusing attention on downstream functions.

(3.1) Functions of aGW 2

In the aGW 20, the upper-level device IF 21 is a communication interface between the aGW 20 and the NW 10. The IF 21 has a function that transmits downstream data segments (downstream packets), for example, audio data segments addressed from the NW 10 to the UE 40 to the ROHC compressor 22B of the PDCP processor 22, and transmits upstream data segments (upstream packets), for example, audio data segments received from the ROHC decompressor 22E of the PDCP processor 22 to the NW 10.

The S1-FP transmission processor 23 has a function that converts downstream data segments (PDCP packets), which are received from the PDCP processor 22 after ROHC processing and ciphering processing by the PDCP processor 22, into the inter-device IF protocol (S1-FP) (for example, attachment of an S1-FP header) to the eNB 30, and then transmits the data segments to the eNB 30. In this embodiment, the processor 23 also has a function that attaches sequence numbers (SNs) in S1-FP, other than sequence numbers (SNs) in PDCP, to the S1-FP headers during the protocol conversion.

The S1-FP reception processor 24 has a function that converts protocol fields of upstream data segments (S1-FP packets) received from the eNB 30 (the S1-FP transmission processor 32) into PDCP (for example, termination of an S1-FP header), and then transmits the data segments to the deciphering processor 22D of the PDCP processor 22. In this embodiment, the processor 24 also has the following functions:

(1) A data packet determination function that determines whether upstream PDCP packets are user data segments (data packets) or dummy data segments (dummy packets) and transmits only the PDCP packets of the user data segments to the deciphering processor 22D.

(2) A discard SN notification function that determines whether any of the upstream packets is a discard notification packet that notifies generation of discard (missing) of a downstream packet at the eNB 30 during the protocol conversion (termination of an S1-FP header), extracts a discard SN attached to the discard notification packet (an SN in S1-FP attached to a discarded PDCP packet) and notifies the SN to the ROHC controller 22A if the upstream packet is the discard notification packet.

Figure 2:
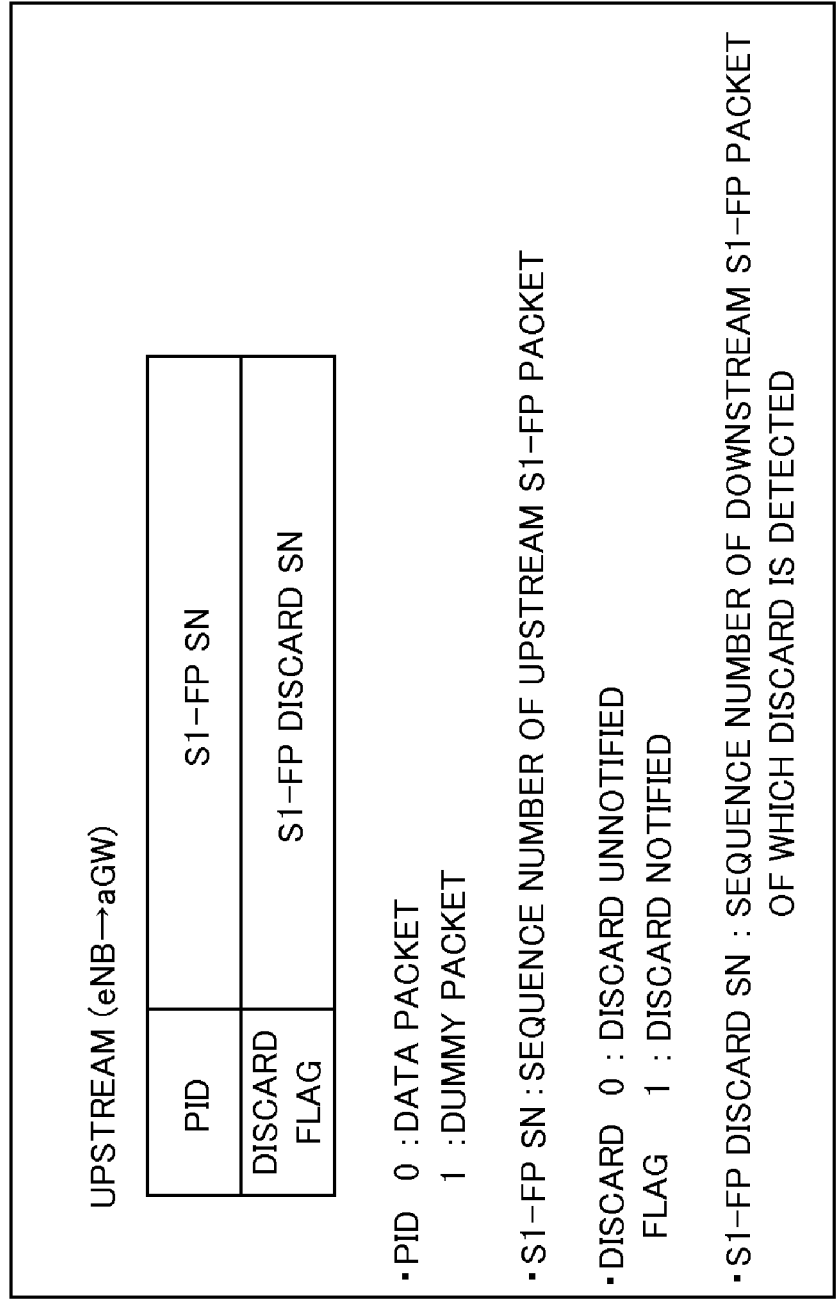
FIG. 2 is a schematic view illustrating a header format of an S1-FP packet in a direction from an eNB to an aGW in the wireless communication system illustrated in FIG. 1.

The data packet (the dummy packet) and the discard notification packet are determined based on, for example, S1-FP header information that is attached by the S1-FP transmitter 32 of the eNB 30 as illustrated in FIG. 2.

More specifically, the following fields are defined as information fields of the S1-FP header:

(a) a PID field indicating information (0: data packet, 1: dummy packet) that determines (notifies) whether transmission packets (upstream PDCP packets) are user data segments (data packets) or dummy data segments (dummy packets), (b) an SN field setting SNs of the upstream PDCP packets (data packets or dummy packets) in S1-FP, (c) a discard flag field indicating the state of the discard notification (for example, 0: no discard notification, 1: discard notification), and (d) a discard SN field indicating the SN (the discard SN) of a discarded PDCP packet in S1-FP.

Hence, the S1-FP reception processor 24 determines whether packets received from the eNB 30 (the S1-FP transmission processor 32) are data packets or dummy packets based on the information of the PID field during protocol conversion from S1-FP to PDCP, and then transmits the packets to the deciphering processor 22D if they are data packets or discards the packets if they are dummy packets. Furthermore, the processor 24 determines whether any of the received packets is the discard notification packet based on information set in the discard flag field, and then can notify the discard SN set in the discard SN field to the ROHC controller 22A.

In other words, in this embodiment, packet discard notification from the eNB 30 to the aGW 20 is performed using a data packet by attaching the S1-FP header (PID field: 0, discard flag field: 1, and discard SN) to the data packet if an upstream PDCP packet (a data packet) to the aGW 20 is present.

In the PDCP processor 22, the ROHC compressor 22B has a function that performs ROHC processing (compression) to downstream data segments (PDCP packets) addressed from the upper-level device IF 21 to the UE 40 under control (compression control) from the ROHC processor 22A. In this embodiment, the compressor 22B also has a function that notifies sequence numbers (SNs) of the downstream data segments to the ROHC controller 22A for creating the correspondence table 22a.

The ciphering processor 22C has a function that performs ciphering (encryption) processing to downstream data segments after ROHC compression control by the ROHC compressor 22B.

The ROHC controller 22A has a function that manages the compression states of ROHC (three states IR, FO, and SO) and controls compression processing (a header compression level) of the ROHC compressor 22B. In this embodiment, the controller 22A also has a function that checks (determines) which of the three states was a compression state of a discarded downstream data segment, determines the header compression level of the next PDCP packet to be transmitted depending on the checked results, and then notifies the level to the ROHC compressor 22B, upon notification of an SN (SN in S1-FP) of a downstream data segment discarded by the eNB 30 from the S1-FP reception processor 24.

For example, if a discarded downstream data segment is an uncompressed data segment, the controller 22A controls the compression state of the ROHC compressor 22B into the IR state so as to transmit the subsequent downstream data segments in an uncompressed state. If discarded downstream data segment is a compressed data segment, the controller 22A can maintain the compression state of the ROHC compressor 22B in the current state because the receiver (the UE 40) can decodes the compressed data segments based on a received uncompressed data segment.

Accordingly, the ROHC controller 22A of this embodiment must manage which downstream data segment (PDCP packet) was discarded (especially, whether a discarded data segment was an uncompressed data segment or a compressed data segment), and which of the three states was a header compression level of the discarded downstream data segment.

Consequently, the ROHC controller 22A of this embodiment functions as a managing unit generating and updating correspondence information (the correspondence table 22a) that matches SNs (SNs in PDCP) of downstream data segments (PDCP packets) subjected to ROHC processing by the ROHC compressor 22B and SNs (SNs in S1-FP) attached to the downstream data segments by the S1-FP transmission processor 23.

The ROHC controller 22A can grasp the compression state (the header compression level) of each downstream data segment (PDCP packet) by receiving notification of SNs in PDCP from the ROHC compressor 22B, so that the ROHC controller 22A can also create the correspondence table 22a for matching of SNs in PDCP, SNs in S1-FP, and compression states of PDCP packets.

In this case, the ROHC controller 22A can determine a header compression state of a discarded data segment based on a discard SN received from the eNB 30 together with discard notification by the S1-FP reception processor 24 and the correspondence table 22a. In sum, the ROHC controller 22A also functions as a determination unit to determine the state.

The deciphering processor 22D has a function that performs required deciphering processing to upstream PDCP packets (data packets) transmitted from the S1-FP reception processor 24. The ROHC decompressor 22E has a function that performs header decompression processing of ROHC to the upstream data packets after the deciphering processing, and transmits the packets to the NW 10 through the upper-level device IF 21.

(3.2) Function of aGW 30

In the aGW 30, the S1-FP reception processor 31 has a function that converts the protocol fields of received packets (S1-FP packets) from the aGW 20 (the S1-FP transmission processor 23) into PDCP (for example, termination of S1-FP headers), and then transmits the packets to the RLC processor 33 (the PDCP-SDU divider (the RLC-PDU generator) 33A). In this embodiment, the processor 31 also has a function that monitors SNs attached to the S1-FP headers by the aGW 20 (the S1-FP transmission processor 23), detects missing (SN dropout) of a S1-FP packet, and notifies the SN to the discard notification controller 36 (the SN retrieving processor 36A).

In the RLC processor 33, the PDCP-SDU divider (the RLC-PDU generator) 33A generates data segments (RLC-PDUs) of the RLC layer from received packets (PDCP packets) transmitted from the S1-FP reception processor 31. In other words, as described above with reference to FIG. 16, the divider 33A has a function that divides SDUs (PDCP-SDUs) of received packets as needed into generate RLC packets (RLC-PDUs) and that transmits the packets to the MAC processor 34. In this embodiment, the divider 33A also has a function that creates the corresponding table 33a matching SNs in S1-FP to SNs of generated RLC packets during the generation process of the RLC packets and that notifies contents of the correspondence table 33a to the discard notification controller 36 (the SN retrieving processor 36A).

The RLC discard detector 33B has a function that detects discard (missing) of an RLC packet by the RLC discard function during the generation of the RLC packets by the RLC-PDU generator 33A and that notifies the SN (the SN in RLC) of the discarded RLC packet to the SN retrieving processor 36A of the discard notification controller 36 upon detection of the discard.

The PDCP-SDU generator (the RLC terminator) 33C has a function that generates (for example, termination of RLC headers) PDCP packets (PDCP-SDUs) from upstream data segments (RLC packets) that are transmitted from the UE 40 and are processed by the MAC processor 34, and then transmits the packets to the discard notification controller 36 (the discard notification packet generating processor 36B).

In the MAC processor 34, the discard detector 34A has a function that monitors SNs (SNs in RLC) of RLC packets transmitted from the RLC processor 33 (the RLC-PDU generator 33A), and detects discard (missing) of a RLC packet and that notifies the SN (the SN in RLC) of the RLC packet to the SN retrieving processor 36A of the discard notification controller 36 upon reception of the discard.

More specifically, the eNB 30 of this embodiment can detect missing of data segments received from the aGW 20 (downstream data segments) in any of the three layers S1-FP, RLC, and MAC (the S1-FP reception processor 31, the RLC discard detector 33B, and the discard detector 34A), and can notifies (collects) the results of the detection to the discard notification controller 36 (the SN retrieving processor 36A).

The wireless terminator 35 has a function that performs required wireless transmission processing (for example, DA conversion, modulation, up-conversion, power amplification) for downstream data segments after the required MAC processing by the MAC processor 34 to generate a downstream wireless signal and then transmits the signal to the UE 40, and another function that performs required wireless reception processing (for example, low-noise amplification, down-conversion, demodulation, AD conversion) for an upstream wireless signal received from the UE 40, and then transmits the signal to the MAC processor 34.

The discard notification controller 36 has a function that notifies the discard (missing) to the ROHC controller 22A of the aGW 20 if the discard (missing) of downstream data segment is detected by any one of the S1-FP reception processor 31, the RLC discard detector 33B, and the discard detector 34A.

For this reason, the SN retrieving processor 36A has the correspondence table 36a that matches SNs in S1-FP to SNs in RLC, for example, in a memory (not illustrated), and has a function that identifies the SN (the SN in S1-FP) of the discarded S1-FP packet by searching the correspondence table 36a for the SN, upon notification of the SN in the RLC from the RLC discard detector 33B of the RLC processor 33 or the discard detector 34A of the MAC processor 34, and then notifies the SN (the discard SN) to the S1-FP transmission processor 32.

However, the SN retrieving processor 36A does not need to retrieve the table if the S1-FP reception processor 31 detects discard of an S1-FP packet and notifies the SN in the S1-FP, and directly notifies the SN as a discard SN to the S1-FP transmission processor 32. In addition, the correspondence table 36a is generated and updated by receiving contents notification of the correspondence table 33a generated during generation of RLC packets by the RLC-PDU generator 33A from the RLC processor 33.

The discard notification packet generating processor 36B performs discard notification to the aGW 20 (the ROHC controller 22A) using a PDCP packet if upstream data segments (PDCP packets) from the RLC processor 33 (the PDCP-SDU generator 33C) are present, upon reception of notification of discard generation of downstream data segments from the SN retrieving processor 36A. For this reason, the processor 36B has a function that transmits the PDCP packet to the S1-FP transmission processor 32 without processing, generates a dummy data segment (a dummy packet) if upstream data segments are not present, and then transmits the data segment to the S1-FP transmission processor 32.

The S1-FP transmission processor 32 has a function that converts (for example, attaches an S1-FP header) protocol fields of the upstream PDCP packet from the discard notification packet generating processor 36B into the inter-device IF protocol (S1-FP) between the processor 32 and the aGW 20, and then transmits the packet to the aGW 20 (the S1-FP reception processor 24). In this embodiment, the processor 32 also has a function that attaches an S1-FP header containing a discard flag (1), a PID (0 or 1), an SN in upstream S1-FP, and a notified discard SN to the upstream PDCP packet (the data packet or the dummy packet), as is described in FIG. 2, upon reception of notification of an SN (a discard SN) in S1-FP from the discard notification packet generating processor 36B.

(3.3) Function of the UE 40

In the UE 40, the MAC/PHY processor 41 has a function that receives a wireless signal transmitted from the eNB 30, that subjects the signal to required wireless reception processing (for example, low-noise amplification, down-conversion, demodulation, AD conversion), and that subjects received downstream packets after the wireless reception processing to required MAC processing.

The RLC processor 42 has a function that subjects the packets (RLC packets) received from the MAC/PHY processor 41 to required RLC processing (for example, termination of RLC headers). The PDCP processor 43 has a function that subject the received packets after the RLC processing to required PDCP processing (for example, termination of PDCP headers and header decoding of the ROHC), and then reproduces audio data segments.

(3.4) Description of Operation

Figure 4:
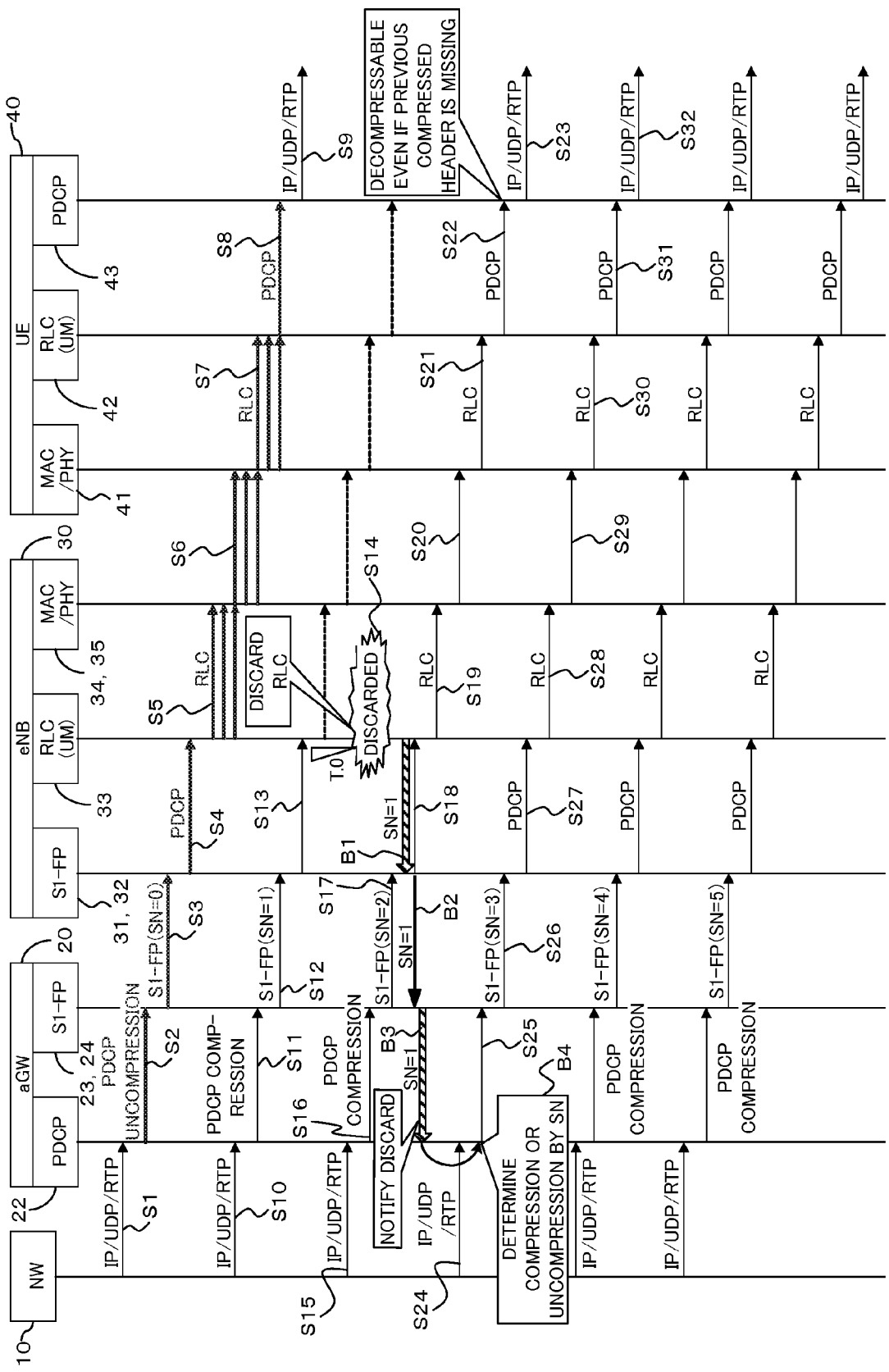
FIG. 4 is a sequence view illustrating another operation (a method of controlling header compression) of the wireless communication system illustrated in FIG. 1.

An operation of the wireless communication system having a configuration described above, especially an operation when a downstream data packet is missing, is described with reference to FIGS. 3 through 6. FIG. 3 illustrates a sequence when a downstream data segment (an uncompressed data segment) is discarded by the RLC discard function (timeout) at the eNB 30, and FIG. 4 illustrates a sequence when a downstream data segment (a compressed data segment) is discarded at the eNB 30.

(In the Case where Uncompressed Data Segment is Discarded)

First, processing when a downstream data segment (an uncompressed data segment) is discarded by the RLC discard function (timeout) at the eNB 30 is explained with reference to FIG. 3.

When the aGW 20 receives a downstream packet from the NW 10 (Step S1), the aGW 20 subjects the downstream packet to ROHC processing (here, the IR state and uncompression processing) and ciphering processing by the ROHC compressor 22B and the ciphering processor 22C of the PDCP processor 22, and then transmits the packet to the S1-FP transmission processor 23 (Step S2). Then, the S1-FP transmission processor 23 attaches an SN (0) in S1-FP to the S1-FP header in the packet, and then transmits the packet to the eNB 30 (Step S3). The S1-FP transmission processor 23 attaches an SN in S1-FP to the downstream packet by incrementing the SN in the S1-FP every time receiving a downstream packet (a PDCP packet) from the PDCP processor 22.

In the eNB 30, the S1-FP reception processor 31 receives the downstream packet, and then transmits the packet to the RLC processor 33 after termination of the S1-FP header (Step S4). Then, the RLC-PDU generator 33A of the RLC processor 33 generates an RLC-PDU. At that time, when discard of a PDCP packet is generated by the RLC discard function (timeout) (Step S5), an uncompressed data segment does not reach the UE 40 (see the dotted arrows).

If the UE 40 receives a downstream packet transmitted from the NW 10 to the aGW 20 subsequent to the uncompressed data segment after the downstream packet is header-compressed by the PDCP processor 22 (the ROHC compressor 22B) of the aGW 20 in a compressed state other than the IR state (here, the SO state) through the eNB 30 (Steps S6 to S13), the UE 40 cannot decompress the header of the compressed data segment and thus cannot decode the received packet.

In the meantime, the RLC processor 33A (the RLC discard detector 33B) of the eNB 30 detects the discard of the uncompressed data segment, and notifies the SN (the SN in RLC) of the discarded RLC packet to the discard notification controller 36 (the SN retrieving processor 36A). As a result, an SN in S1-FP corresponding to the SN in RLC is retrieved from the correspondence table 36a, and the controller 36 notifies the retrieved SN (=0) as a discard SN to the S1-FP transmission processor 32 (Step A1).

The S1-FP transmission processor 32 attaches an S1-FP header (see FIG. 2) containing a discard flag (=1), a PID (=0 or 1), an SN in upstream S1-FP, and the notified discard SN (0) to an upstream PDCP packet (a data packet or a dummy packet) transmitted from the discard notification generating processor 36B, and then transmits the upstream PDCP packet to the aGW 20 (Step A2).

The S1-FP reception processor 24 of the aGW 20 receives the upstream S1-FP packet, and determines that the received packet is a discard notification packet by termination of the S1-FP header. Then, the processor 24 notifies the discard SN to the ROHC controller 22A of the PDCP processor 22 (Step A3).

In the case where the discard notification packet is the data packet to which the S1-FP header is attached (PID=0), the data packet is transmitted to the deciphering processor 22D for deciphering processing, and then is transmitted to the NW 10 through the upper-level device IF 21 after ROHC decoding processing of the ROHC decompressor 22E.

On the contrary, the ROHC controller 22A receiving the notification of the discard SN from the S1-FP reception processor 24 searches the correspondence table 22a for the notified discard SN, and then identifies (determines) whether the discarded PDCP packet is an uncompressed data or a compressed data. In this embodiment, since the ROHC controller 22A determines that the discarded data segment is an uncompressed data segment, the controller 22A causes a compression state to vary to the IR state, and then controls the state of the ROHC processing of the ROHC compressor 22B to an uncompressed state (Step A4).

Hence, at this time, a downstream packet, which is received from the NW 10 (Step S14) and should be transmitted to the eNB 30, is transferred to the S1-FP transmission processor 23 as an uncompressed data segment without header compression (Step S15), and then is transmitted from the S1-FP transmission processor 23 to the UE 40 through the eNB 30 (Steps S16 to S19).

As a result, the UE 40 can receive a new uncompressed data segment within a shorter time since discard of an uncompressed data segment occurs at the eNB 30, compared to conventional processing, and can receive the uncompressed data segment normally (Steps S20 to S22). Even if the subsequently received compressed data segment is incomplete, the compressed header can be decompressed based on the uncompressed data segment previously received.

Figure 5:
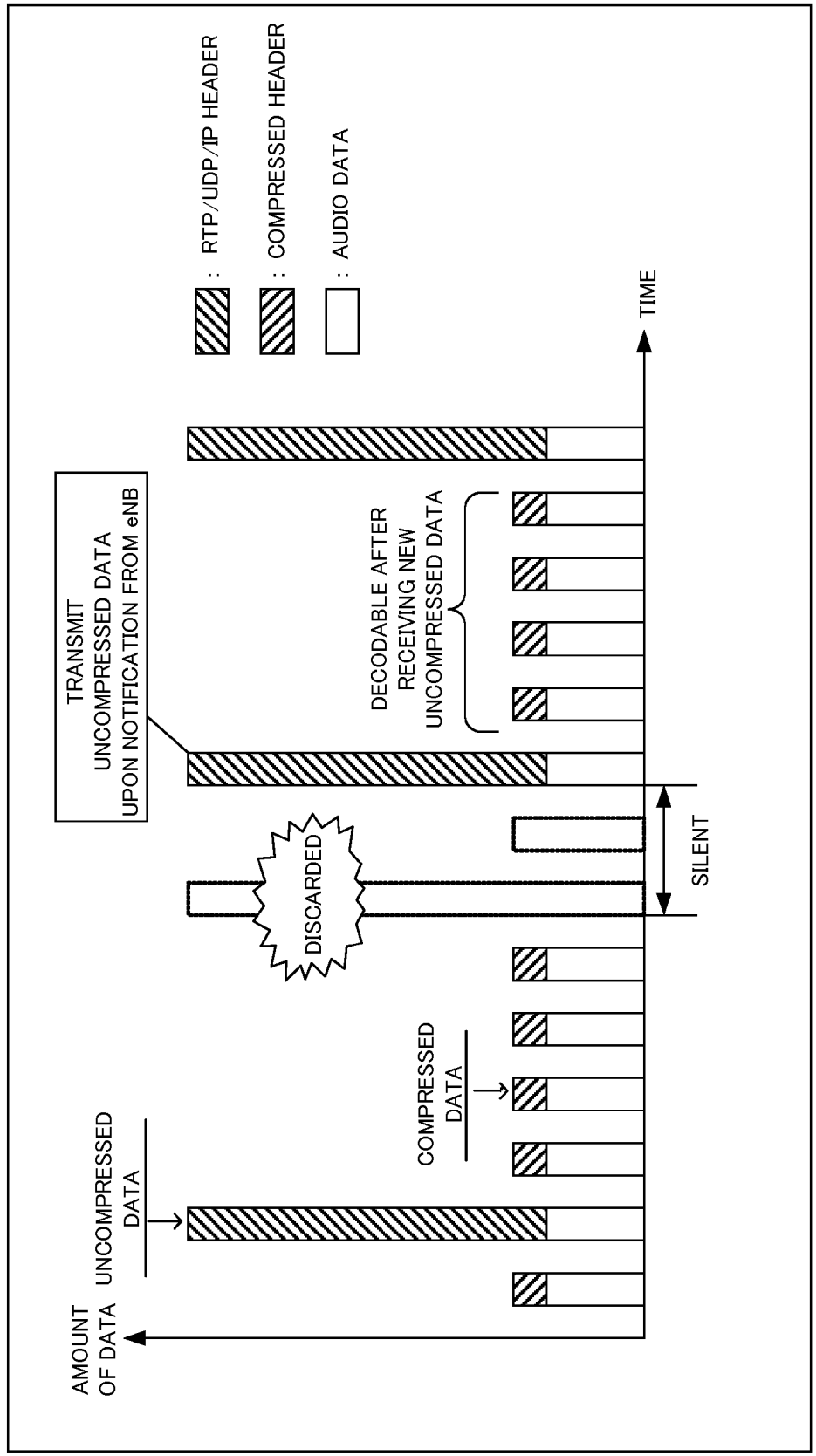
FIG. 5 is a schematic view illustrating a transmission image of a downstream packet (uncompressed data and compressed data) in the wireless communication system illustrated in FIG. 1.

Consequently, as schematically illustrated in FIG. 5, the silence period generated by the missing of the uncompressed data segment can be significantly reduced compared to conventional processing (see FIG. 20). In addition, the aGW 20 can control the compression state of the ROHC to the IR state by receiving missing notification of the downstream packet from the eNB 30, which is an intermediate node, at an early stage, and can suppress transmission of useless downstream packets (compressed data segments) that cannot be decompressed by the UE 40. Therefore, loss of the downstream wireless band of the wireless zone (between the eNB 20 and the UE 40) can be suppressed.

(In the Case where Compressed Data is Discarded)

Next, processing in the case where a compressed data segment (not an uncompressed data segment) is discarded by the RLC discard function (timeout) at the eNB 30 is explained with reference to FIG. 4.

When the aGW 20 receives a downstream packet from the NW 10 (Step S1), the aGW 20 subjects the downstream packet to ROHC processing (uncompression) and ciphering processing in the ROHC compressor 22B and the ciphering processor 22C of the PDCP processor 22, and then transmits the packet to the S1-FP transmission processor 23 (Step S2). Then, the S1-FP transmission processor 23 attaches an SN (=0) in S1-FP to the S1-FP header in the packet, and then transmits the packet to the eNB 30 (Step S3).

In the eNB 30, the S1-FP reception processor 31 receives the downstream packet, and then transmits the packet to the RLC processor 33 after termination of the S1-FP header (Step S4). Then, the RLC-PDU generator 33A of the RLC processor 33 generates an RLC-PDU. The generated RLC-PDU is transmitted to the MAC processor 34, and then is subjected to required MAC processing in the MAC processor 34. Then, the RLC-PDU is transmitted to the wireless terminator 35, and is transmitted to the UE 40 after required wireless transmission processing (Steps S5 and S6).

The UE 40 performs decoding processing of the downstream packet in the MAC/PHY processor 41, the RLC processor 42, and the PDCP processor 43, upon reception of the downstream packet (RLC-PDU) (Steps S7 to S9).

When the aGW 20 receives the subsequent downstream packet from the NW 10 (Step S10), the aGW 20 subjects the downstream packet to the ROHC processing (header compression of the SO state) and ciphering processing in the ROHC compressor 22B and the ciphering processor 22C of the PDCP processor 22 under assumption that the compression state of ROHC processing varies from the IR state to the SO state, and then transmits the packet to the S1-FP transmission processor 23 (Step S11). The S1-FP transmission processor 23 attaches an SN (=1) in S1-FP to the S1-FP header, and then transmits the packet to the eNB 30 (Step S12).

In the eNB 30, the S1-FP reception processor 31 receives the downstream packet (the compressed data segment), and then transmits the packet to the RLC processor 33A, for example, after the termination of the S1-FP header (Step S13). The RLC processor 33 generates an RLC-PDU from the transmitted downstream packet (the PDCP packet) in the RLC-PDU generator 33A. At this time, when discard of the PDCP packet is performed by the RLC discard function (timeout) (Step S14), the compressed data does not reach the UE 40 (see the dotted arrows).

In this embodiment, however, the UE 40 can normally receive the uncompressed data segment, so that the UE 40 can correctly decompress and decode the subsequent downstream packet (the compressed data segment: SN=2 in S1-FP) based on the header of the received uncompressed data segment even if the UE 40 cannot receive the compressed data segment (SN=1 in S1-FP) (Steps S15 to S23).

Accordingly, the compression state by the ROHC compressor 22B of the aGW 20 may not be changed. Consequently, the eNB 30 notifies a discard SN to the ROHC controller 22A of the aGW 20 using the S1-FP header of an upstream packet in the same manner as that of discard of an uncompressed data segment when the RLC discard detector 33B detects the discard of the compressed data segment (Steps B1 to B3). The ROHC controller 22A searches the correspondence table 22a for the notified discard SN, and maintains the current state (the SO state) without changing the compression state of ROHC processing if the S1-FP packet corresponding to the discard SN is a header-compressed data segment (Step B4).

Hence, the subsequent downstream packet (SN=3 in S1-FP) transmitted from the NW 10 to the aGW 20 is header-compressed by the ROHC compressor 22B of the aGW 20 in the same compression level as that of the previously transmitted downstream packet (SN=2 in S1-FP), and then is transmitted to the UE 40 through the eNB 30 for reception processing (Steps S24 to S32).

When discard or missing of a downstream packet is detected by the S1-FP reception processor 31 or the discard detector 34A of the MAC processor 34, the result of the detection (discard or missing notification) is collected to the discard notification controller 36, and the controller 36 performs discard or missing notification to the aGW 20 (the ROHC controller 22A) by an upstream packet (a data packet or a dummy packet).

In other words, when missing of a downstream packet is detected by the S1-FP reception processor 31, an SN of the missing packet in S1-FP is ascertained without retrieving of the correspondence table 36a by the SN retrieving processor 36A, the SN is directly notified to the ROHC controller 22A of the aGW 20 as a discard SN.

On the other hand, when missing of a downstream packet is detected by the discard detector 34A of the MAC processor 34, an SN in RLC is notified to the discard notification processor 36. The processor 36 searches the correspondence table 36a for the SN in RLC, acquires the SN in S1-FP corresponding to the notified SN, and then notifies the SN as the discard SN to the ROHC controller 22A of the aGW 20.

As described above, in this embodiment, when an uncompressed data segment is discarded or missing in the process in which the eNB 30 receives a downstream packet addressed to the UE 40 and transmits the packet to the UE 40, the eNB 30 can notify (send feedback) the situation to the aGW 20 immediately, and can change the compression state of the ROHC to the IR state (uncompressed state). This can reduce the time period when compressed data segments cannot be decoded correctly due to incorrect reception of an uncompressed data segment by the UE 40.

Consequently, loss of wireless resources, for example, the downstream band in the wireless zone from the eNB 30 to the UE 40 can be suppressed. In addition, the number of compressed data segments that cannot be decoded and are discarded by UE 40 can be reduced.

Especially, the UE 40 can detect incorrect reception of an uncompressed data segment at an early stage before transmission of the data segment to the wireless zone, and then can notify the situation to the aGW 20, so that the aGW 20 can change the header compression state of a downstream packet addressed to the UE 40 to the IR state at the early stage. This can suppress loss of the downstream wireless resources.

In addition, missing notification from the eNB 30 to the aGW 20 is performed using an upstream packet (a user data segment) addressed from the UE 40 to the aGW 20, so that the utilization efficiency of communication resources from a wireless base station to a transmitter can be improved.

Furthermore, if no upstream packet addressed from the UE 40 to the aGW 20 is present, the eNB 30 (the discard notification packet generator 36B) generates a discard notification packet and transmits the packet to the aGW 20, preventing delay in the discard notification.

In addition, even when the protocol of downstream packets addressed to the UE 40 is converted, for example, from S1-FP to RLC or RLC to MAC, the eNB 30 manages the correspondence of continuity (SNs) of the downstream packets before and after the protocol conversion by the correspondence tables 36a and 33a, so that the eNB 30 identify the SN of the missing packet before the protocol conversion. This enables the eNB 30 to surely notify the SN of the missing packet to the aGW 20.

(3.5) Variation

The above-mentioned embodiment assumes that the S1-FP transmission processor 23 of the aGW 20 attaches an SN in S1-FP to each of the downstream packets. This is because the ciphering processor 22C of the aGW 20 performs ciphering processing to a PDCP-PDU (a payload portion including a PDCP header) for data encryption, so that the eNB 30 cannot recognize the SN in PDCP even if the eNB 30 detects discard.

In other words, even though the eNB 30 notifies only the generation of discard to the aGW 20 in such a condition that the eNB 30 cannot identify whether the discarded packet is an uncompressed data segment or an uncompressed data segment, the aGW 20 cannot determine which down stream packet (that is, either an uncompressed data segment or a compressed data segment) is discarded. For this reason, if the aGW 20 changes the compression state to the IR state in the case where the compressed data segment is discarded, the aGW 20 transmits unnecessary uncompressed data segments. This may adversely affect the downstream wireless band.

For this reason, in the above embodiment, SNs in S1-FP in addition to SNs in DPCP are attached to downstream packets addressed to the eNB 30, and the correspondence table 22a manages the correspondence between the packets and the SNs together with a correspondence between the packets and compression states. The aGW 20 can therefore identify whether the discarded packet is an uncompressed data segment or a compressed data segment, can change the compression state of ROHC processing to the IR state only if the discarded packet is an uncompressed data segment, and can transmit the uncompressed data segments.

In the case of emphasis on a reduction in scales of the aGW 20 and the eNB 30 and simplification of control, or acceptance of the transmission of unnecessary uncompressed data segments, the eNB 30 may perform only discard notification to the aGW 20, and the aGW 20 may unconditionally change the compression state to the IR state, and then transmit the uncompressed data segments, upon reception of the discard notification.

Figure 6:
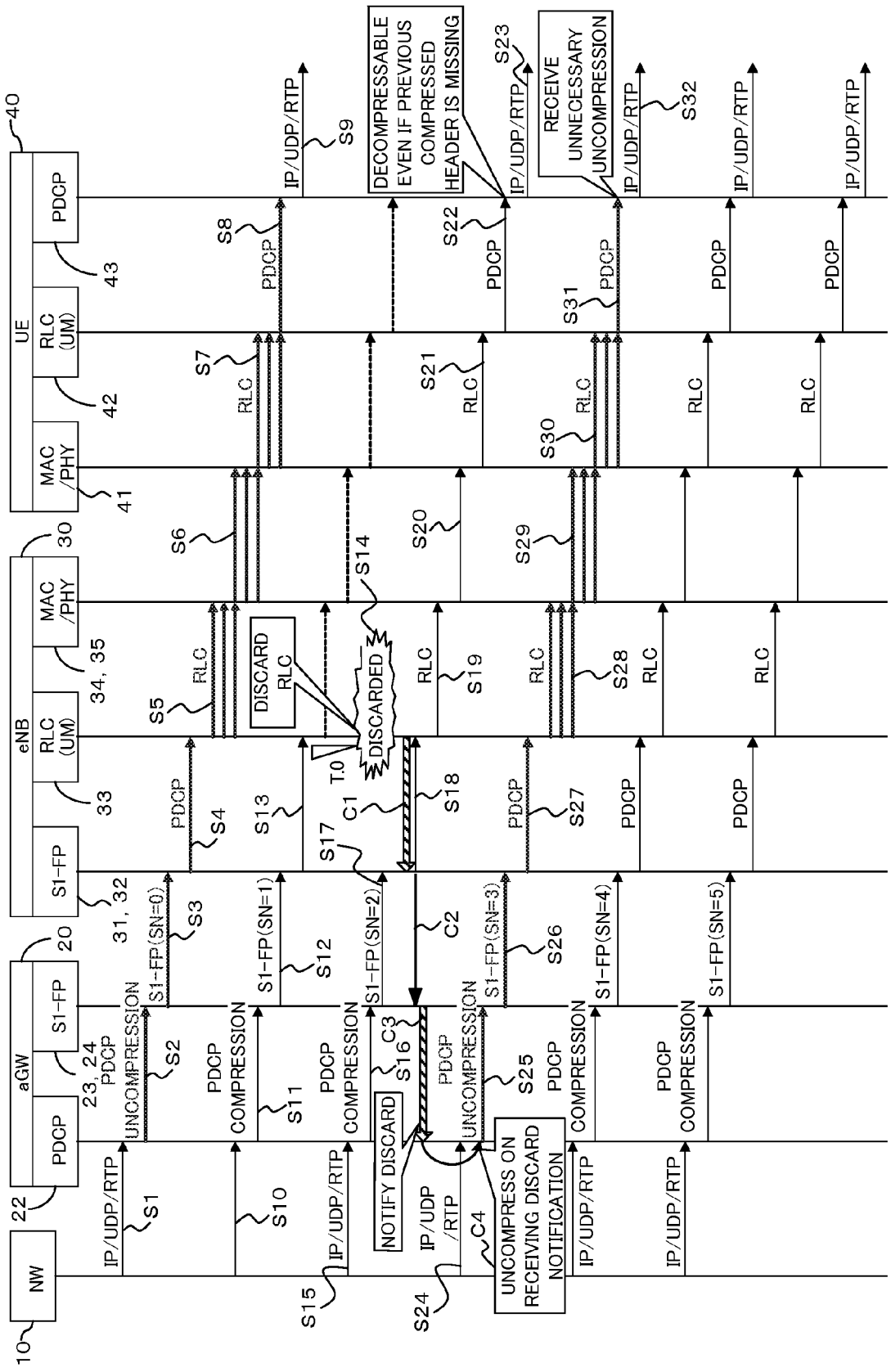
FIG. 6 is a sequence view illustrating another operation (a method of controlling header compression) of the wireless communication system illustrated in FIG. 1.

FIG. 6 illustrates the processing sequence.

When the RLC discard detector 33B of the eNB 30 detects discard of a compressed data segment, the detector 33B notifies the detection to the discard notification controller 36. The controller 36 (the discard notification generating processor 36B) notifies the generation of the discard packet to the aGW 20 (the ROHC controller 22A) using an upstream packet (a data packet or a dummy packet) through the S1-FP transmission controller 32 (Steps C1 to C3).

Since the ROHC controller 22A that receives the notification cannot identify the discard SN, it unconditionally changes the compression state of the ROHC of the ROHC compressor 22B to the IR state and then transmits the subsequence downstream packet as an uncompressed data segment (Step C4). The other operations are the same as those described in FIG. 4 (Steps S1 to S32). The operation when discard or missing of a downstream packet is detected by the S1-FP reception processor 31 or the discard detector 34A of the MAC processor 34 is also the same as that described above.

[4] Second Embodiment

In the first embodiment, the aGW 20 determines whether the downstream packet in which an error (discard or missing) occurs is an uncompressed data segment or a compressed data segment. In other words, the ROHC controller 22A of the aGW 20 searches the correspondence table 22a for the discard SN notified by an upstream packet (a discard notification packet) from the eNB 30, and determines the compression state of the discarded downstream packet.

On the contrary, in this embodiment, the eNB 30 can also determine whether the downstream packet in which an error occurs is an uncompressed data segment or a compressed data segment. If the downstream packet in which an error occurs is a compressed data segment, as described above, the UE 40 can decompress the compressed data segments that are just received, based on an uncompressed data segment that has been already received. Therefore, the UE 40 does not perform error generation notification to the aGW 20 (the ROHC controller 22A), and can perform the error generation notification to the aGW 20 only the case where the downstream packet in which an error occurs is an uncompressed data segment.

In this case, the volume of downstream packets from the eNB 30 to the aGW 20 can be reduced, resulting in efficient utilization of the upstream transmission band between the eNB 30 and the aGW 20.

Figure 7:
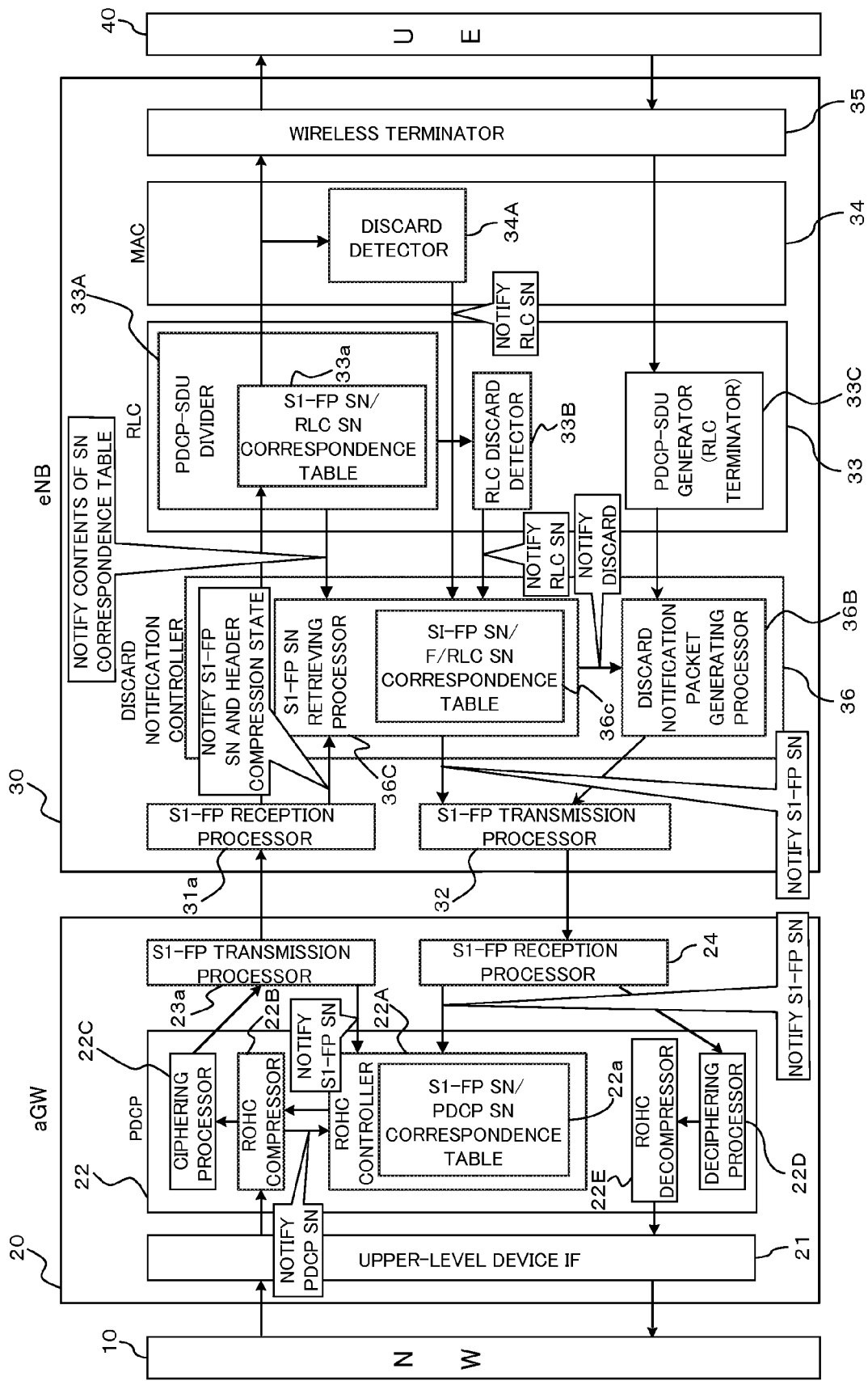
FIG. 7 is a block diagram illustrating a structure of a wireless communication system according to a second embodiment.

FIG. 7 illustrates a configuration of a wireless communication system according to the second embodiment to achieve such a function. The wireless communication system illustrated in FIG. 7 differs from the system described in the first embodiment (see FIG. 1) in that the wireless communication system has an S1-FP transmission processor 23a instead of the S1-FP transmission processor 23 in the aGW 20, an S1-FP reception processor 31a instead of the S1-FP reception processor 31, and an SN retrieving processor 36C (a correspondence table 36c) instead of the SN retrieving processor 36A in the eNB 30. The components designated by the same reference numerals as above have the same or similar functions as those of the components described above, unless otherwise noted.

The S1-FP transmission processor 23a of the aGW 20 has a function that converts the protocol fields of downstream data segments (PDCP packets) (for example, attachment of an S1-FP header), which are received from the PDCP processor 22 after ROHC processing and ciphering processing in the PDCP processor 22, into the inter-device IF protocol (S1-FP) between the aGW 20 and the eNB 30, and then transmits the data segments to the eNB 30.

Figure 8:
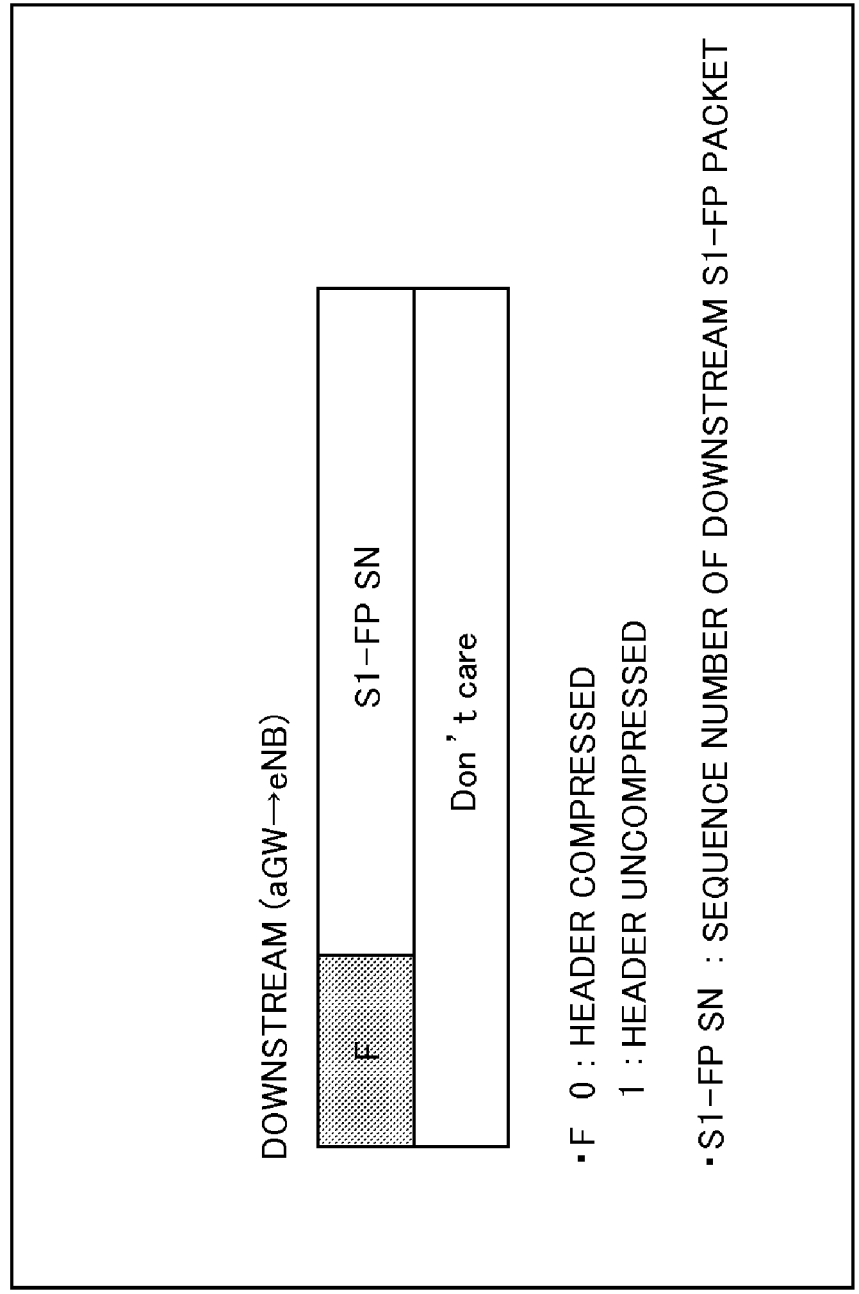
FIG. 8 is a schematic view illustrating a header format of an S1-FP packet in a direction from an eNB to an aGW in the wireless communication system illustrated in FIG. 7.

However, for discrimination of the compressed or uncompressed data in the eNB 30, the S1-FP transmission processor 23a of this embodiment has a function that attaches, for example, flag (F) information indicating the header compression (0: presence of header compression, 1: absence of header compression) of the ROHC to the S1-FP header together with a sequence number (an SN) in S1-FP, aside from a sequence number (an SN) in PDCP, as illustrated in FIG. 8. The information on the presence or absence of the header compression can be received from the PDCP processor 22 together with PDCP packets from the PDCP processor 22 (the deciphering processor 22C).

The S1-FP reception processor 31a of the eNB 30 converts (for example, termination of an S1-FP header) the protocol fields of the packets (S1-FP packets) received from the aGW 20 (the S1-FP transmission processor 23a) into PDCP, and then transmits the packets to the RLC processor 33 (the PDCP-SDU divider (the RLC-PDU generator) 33A). The processor 31a of this embodiment also has the following functions:

(1) An SN detection function for monitoring SNs in S1-FP attached to the S1-FP headers and detecting the SN of a missing S1-FP packet;

(2) A compression flag detection function for detecting the flag information (0 or 1) including in the compression flag information filed in the S1-FP header; and (3) A notification function for notifying the detected SN and flag information to the discard notification controller 36 (the SN retrieving processor 36A).

The SN retrieving processor 36C has a function that detects the SN (a discarded SN) in S1-FP of a discarded downstream packet, and then notifies the SN to the discard notification packet generating processor 36B. The processor 36C of this embodiment also has the following functions:

(1) A table generation function for generating the correspondence table 36c that matches the SN in the S1-FP and the flag information with SNs in RLC;

(2) A table retrieving (SNs and compression flags) and detection function for searching the correspondence table 36c for an SN in RLC notified from the RLC discard detector 33B of the RLC processor 33 or the discard detector 34A of the MAC processor 34, and detecting an SN (the SN in S1-FP) and flag information of the discarded S1-FP packet; and (3) A discard SN notification function for notifying the detected SN as a discard SN to the discard notification packet generating processor 36B only the case where the flag information indicates header uncompression (F=1).

Namely, the SN retrieving processor 36C of this embodiment does not notify the discard SN if the flag information indicates header compression (F=0). This can suppresses transmission of useless discard notification packets (dummy packets) to the aGW 20.

Figure 9:
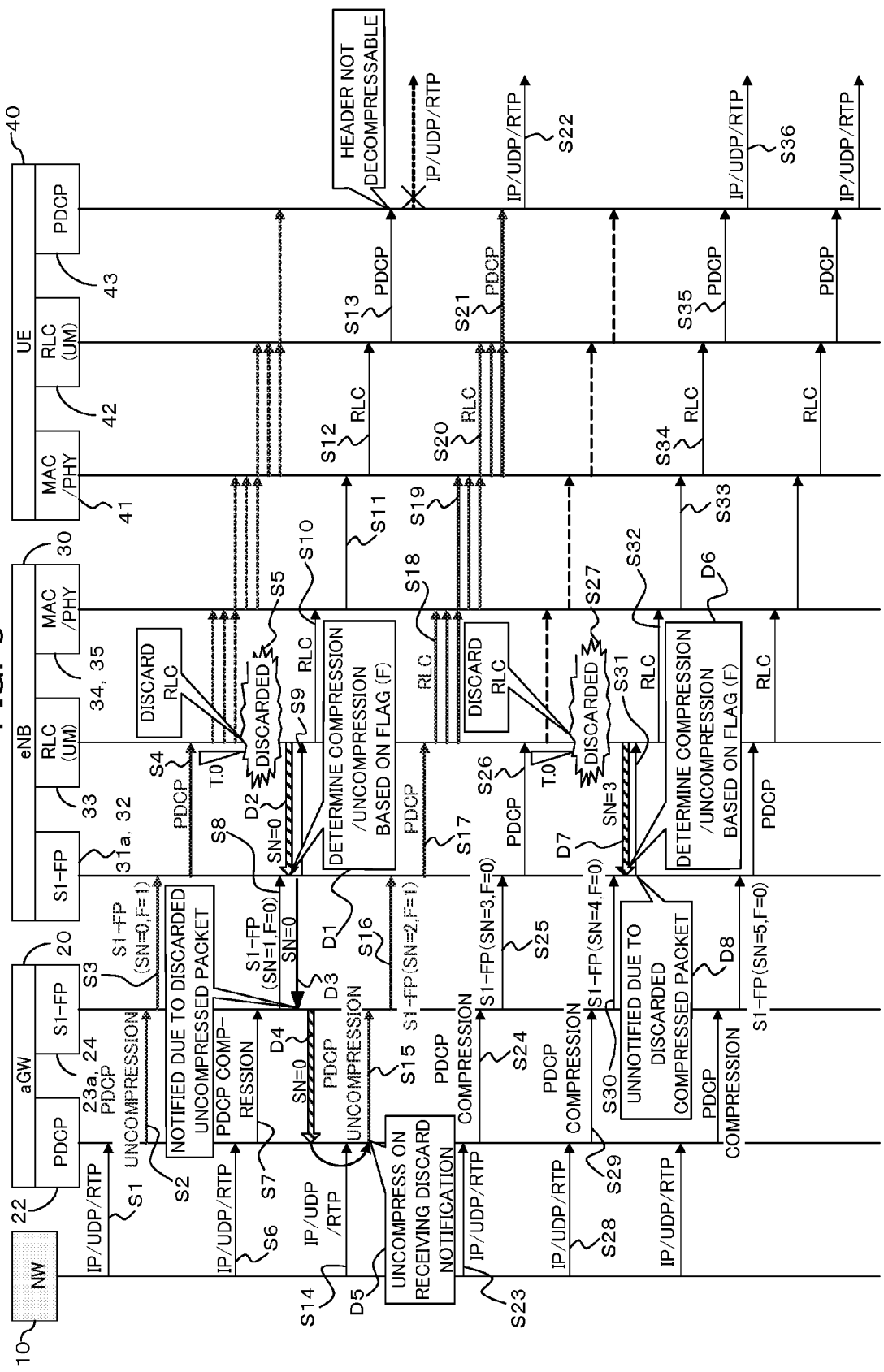
FIG. 9 is a sequence view illustrating another operation (a method of controlling header compression) of the wireless communication system illustrated in FIG. 7.

The wireless communication system of the second embodiment having the configuration described above is explained below with reference to FIG. 9, focusing attention on generation of discard of a downstream packet (a compressed data segment) in the eNB 30, which is a gist of this embodiment.

When the aGW 20 receives a downstream packet from the NW 10 (Step S1), the aGW 20 subjects the downstream packet to ROHC processing (uncompression) and ciphering processing in the ROHC compressor 22B and the ciphering processor 22C of the PDCP processor 22, and then transmits the packet to the S1-FP transmission processor 23 (Step S2). Then, the S1-FP transmission processor 23 attaches an SN (0) in S1-FP and flag information (F=1) to the S1-FP header in the packet, and then transmits the packet to the eNB 30 (Step S3).

In the eNB 30, the S1-FP reception processor 31a receives the downstream packet, and then transmits the packet to the RLC processor 33 after termination of the S1-FP header (Step S4). Then, the RLC-PDU generator 33A of the RLC processor 33 generates an RLC-PDU. When discard of a PDCP packet is generated by the RLC discard function (timeout) (Step S5) at this time, no uncompressed data segment reaches the UE 40.

If the UE 40 receives the downstream packet transmitted from the NW 10 to the aGW 20, subsequent to the uncompressed data segment after the packet is header-compressed by the PDCP processor 22 (the ROHC compressor 22B) of the aGW 20 in a compressed state other than the IR state (the SO state) through the eNB 30 (Steps S6 to S13), the UE 40 cannot decompress the compressed data segment and thus cannot decode the received packet.

On the other hand, the RLC processor 33A (the RLC discard detector 33B) of the eNB 30 detects the discard of the uncompressed data segment, and notifies the SN (SN in RLC) of the discarded RLC packet to the discard notification controller 36 (the SN retrieving processor 36C). Then, an SN in S1-FP corresponding to the SN in RLC and flag information is retrieved from the correspondence table 36c.

The SN retrieving processor 36C checks whether the retrieved flag information indicates "header compressed" or "header uncompressed", and determines the discarded downstream packet is a compressed data segment (F=0) or an uncompressed data segment (F=1) (Step D1). Here, since F is set to 1 (an uncompressed data segment), the SN retrieving processor 36C notifies the retrieved SN (0) to the S1-FP transmission processor 32 as a discard SN (Step D2).

For this reason, the S1-FP transmission processor 32 attaches an S1-FP header (see FIG. 2) including a discard flag (1), a PID (0 or 1), an upstream SN in S1-FP, and the notified discard SN (0) to an upstream PDCP packet (a data packet or a dummy packet) transmitted from the discard notification packet generating processor 36B, and then transmits the upstream PDCP packet to the aGW 20 (Step D3).

The S1-FP reception processor 24 of the aGW 20 receives the upstream S1-FP packet, determines the received packet as a discard notification packet after termination of the S1-FP header, and then notifies the discard SN to the ROHC controller 22A of the PDCP processor 22 (Step D4).

In the case where the discard notification packet is a data packet to which the S1-FP header is attached (PID=0), the data packet is transmitted to the deciphering processor 22D for deciphering processing, and then is transmitted to the NW 10 through the upper-level device IF 21 after ROHC decoding processing in the ROHC decompressor 22E.

On the other hand, the ROHC processor 22A controls the state of the ROHC processing in the ROHC compressor 22B to an uncompressed state (the IR state) upon reception of the notification of the discarded SN from the S1-FP reception processor 24 (Step D5).

As a result, a downstream packet received by the NW 10 (Step S14) and to be transmitted to the eNB 30 at this time is transferred to the S1-FP transmission processor 23a without header compression as an uncompressed data segment (Step S15), and then is transmitted from the S1-FP transmission processor 23a to the UE 40 through the eNB 30 (Steps S16 to S19).

As a result, the UE 40 can receive a new uncompressed data segment within a shorter time since discard of an uncompressed data segment occurs at the eNB 30, compared to conventional processing, and can receive the uncompressed data segment normally (Steps S20 to S22). Even if the subsequently received compressed data segment is incomplete, the compressed header can be decompressed based on the uncompressed data segment previously received.

After that, when the aGW 20 receives the subsequent downstream packet from the NW 10 (Step S23), the aGW 20 subjects the downstream packet to ROHC processing (compression) and ciphering processing in the ROHC compressor 22B of the PDCP processor 22 and the ciphering processor 22C, and then transmit the packet to the S1-FP transmission processor 23a (Step S24). The S1-FP transmission processor 23a attaches an SN (3) in S1-FP and flag information (F=0) indicating "header compressed" to the S1-FP header of the packet, and then transmits the packet to the eNB 30 (Step S25).

In the eNB 30, the S1-FP reception processor 31a receives the downstream packet, and then transmits the packet to the RLC processor 33 after termination of the S1-FP header (Step S26). The RLC-PDU generator 33A of the RLC processor 33 generates an RLC-PDU. At this time, when packet discard occurs by the RLC discard function (timeout) (Step S27), the packet (a compressed data segment) does not reach the UE 40.

The RLC processor 33A (the RLC discard detector 33B) of the eNB 30 detects the discard of the compressed data segment, and notifies the SN (the SN in RLC) of the discarded RLC packet to the discard notification controller 36 (the SN retrieving processor 36C). The SN (3) in S1-FP corresponding to the SN in RLC and the flag information are retrieved from the correspondence table 36c.

The SN retrieving processor 36C checks whether the retrieved flag information indicates "header compressed" or "header uncompressed", and determines that the discarded downstream packet is a compressed data segment (F=0) or an uncompressed data segment (F=1) (Step D6). Here, since F is set to 0 (a compressed data segment), the SN retrieving processor 36C notifies the retrieved SN (3) to neither the S1-FP transmission processor 32 nor the discard notification packet generator 36B. Consequently, the discard SN (3) is not notified to the aGW 20 (Steps D7 and D8).

More specifically, even if discard of a compressed data segment occurs, the UE 40 can decompress the header of the compressed data segment (SN=4 in S1-FP) to be received later based on the uncompressed data segment, as long as the UE 40 normally receives the uncompressed data segment (Steps S28 to S36). Therefore, the eNB 30 does not need to notify the discard to the aGW 20 (the ROHC processor 22A) for changing a header state of a downstream packet to the IR state.

When the discard detector 34A of the MAC processor 34 detects discard or missing of a downstream packet, the detector 34A notifies the SN in RLC to the discard notification controller 36C. The subsequent processing is the same as described above.

As described above, in this embodiment, when the aGW 20 transmits a packet to the eNB 30, the eNB 30 can determine whether a received packet is a compressed data segment or an uncompressed data segment by setting a flag (a header compression flag (F)) for determining a compressed data segment or an uncompressed data segment to the S1-FP header.

Then, the SN retrieving processor 36C manages the correspondence between the SN of the packet in S1-FP received from the aGW 20, the header compression flag (F), and the SN in RLC using the correspondence table 36c in the processor 36C. Thereby, upon reception of the discard notification from the RLC processor 33 (or the MAC processor 34), the processor 36C determines whether the corresponding SN of the downstream packet in RLC is a compressed data segment or an uncompressed data segment, and then performs notification to the S1-FP transmission processor 32 and the discard notification packet generating processor 36B only for the uncompressed data segment, as in the first embodiment.

Therefore, when the RLC processor 33 and the MAC processor 34 detect the discard of a downstream packet, only an SN of a compressed data segment in S1-FP is notified to the aGW 20, and unnecessary discard notification (transmission of a dummy packet) from the eNB 30 to the aGW 20 is reduced. Consequently, utilization efficiency of upstream communication resources, for example, the upstream transmission band, from the eNB 30 to the aGW 20 can be improved.

In the case where the S1-FP transmission processor 31a of the eNB 30 detects missing (an SN dropout) of an S1-FP packet, the discard notification controller 36 performs notification to the aGW 20 regardless of a header-compression state as in the first embodiment because the processor 31a cannot determine whether the packet is a header-compressed packet or a header-uncompressed packet.

[5] Others

In the above embodiments, it is assumed that the compression state of the ROHC varies between the IR state and the SO state. Also, in the case where the state varies between the IR state and the FO state, the same operations and advantageous effects as that in each embodiment described above can be obtained by reading "SO state" as "FO state".

In addition, in the above embodiments, although a target of control (timing of control) of the compression state is the subsequent downstream packet addressed to the UE 40 just after the aGW 20 (the ROHC controller 22A) receives a discard notification from the eNB 30, the controlled target is not necessarily the subsequent packet. In other wards, the third or fourth downstream packet after the subsequent packet (second packet) may be a controlled target as long as a silence period at the receiver is an acceptable range. In summary, compression or uncompression control that deals with missing notification is a necessary and sufficient condition.

According to the embodiments, at least one of the following effects or advantages is obtained:

(1) Loss of wireless resources in the wireless zone from a wireless base station to a wireless terminal can be suppressed by reduction of a time period during which header-compressed data segments (hereinafter referred to as compressed data segments) cannot be decoded correctly due to incorrect reception of a header-uncompressed data segment (hereinafter referred to as an uncompressed data segment) by a wireless terminal.

(2) A wireless terminal can detect that an uncompressed data segment incorrectly received at an early stage before transmission of the data segment to the wireless zone, and then can notify the condition to a transmitter. As a result, the transmitter can switch the header compression states of data segments addressed to the wireless terminal, resulting in suppressed loss of the wireless resources.

(3) The wireless base station performs notification to a transmitter only when a data segment in which missing is detected is an uncompressed data segment, so that utilization efficiency of communication resources from the wireless base station to the transmitter can be improved.

(4) Missing notification from a wireless base station to a transmitter is performed using a data segment addressed from the wireless terminal to the transmitter, so that the utilization efficiency of communication resources from the wireless base station to the transmitter can be improved.

(5) The wireless base station generates a data segment for missing notification and transmits the data segment to a transmitter if data segments addressed from a wireless terminal to the transmitter are not present, so that delay in the missing notification can be prevented.

(6) The wireless base station can identify the sequence number of the missing data segment before protocol conversion by managing the correspondence of continuity of data segments (sequence numbers). As a result, the data segments addressed to a wireless terminal are correctly subjected to the protocol conversion by the wireless base station, and the sequence number of the missing data segment can be successfully transmitted to a transmitter.

As described above in detail, the embodiments can suppress loss of wireless resources in the wireless zone from a wireless base station to a wireless terminal by reduction of a time period when header-compressed data segments cannot be decoded correctly due to incorrect reception of a header-uncompressed data segment by the wireless terminal. Consequently, the embodiments are significantly useful in the field of radio communication technology, for example, of mobile communication technology.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A method of controlling header compression in wireless communication for a wireless communication system including a transmitter that controls header compression states of data segments addressed to a wireless terminal into a compressed or uncompressed state and that transmits the data segments, and a wireless base station that receives the data segments addressed from the transmitter to the wireless terminal and that transmits the data segments to the wireless terminal, wherein the wireless terminal decodes header-compressed data segments transmitted from the wireless base station, based on a received header-uncompressed data segment, the method comprising:

provide, with the wireless base station, a missing notification to the transmitter when detecting the missing of a data segment from the transmitter; and determining, at the transmitter, a header compression state of the missing data segment when receiving the missing notification; and controlling, at the transmitter, a header compression state of a subsequent data segment addressed to the wireless terminal into an uncompressed state when the header compression state of the missing data segment is an uncompressed state.

2. The method of controlling header compression in wireless communication according to claim 1, the method further comprising:

attaching, at the transmitter, a sequence number to each of the data segments addressed to the wireless terminal;

managing, at the transmitter, correspondence information that brings the sequence number into correspondence with information indicating whether the header compression state of the data segment is a compressed or uncompressed state;

detecting, at the wireless base station, the missing by monitoring the sequence numbers of the data segments received from the transmitter;

notifying, at the wireless base station, the sequence number of the missing data segment and the missing notification to the transmitter; and the determining and the controlling, at the transmitter, determines the header compression state of the missing data segment based on the sequence number that is notified from the wireless base station and the correspondence information, and controls the header compression states of the subsequent data segments addressed to the wireless terminal into an uncompressed state when the header compression state of the missing data segment is an uncompressed state.

3. The method of controlling header compression in wireless communication according to claim 2, wherein the transmitter does not switch the header compression states of the subsequent data segments addressed to the wireless terminal when the header compression state of the missing data segment is a compressed state.

4. The method of controlling header compression in wireless communication according to claim 2, wherein the wireless base station manages the correspondence of sequence numbers before and after protocol conversion performed during the transmission of the data segments received from the transmitter to the wireless terminal, and identifies the sequence number of the missing data segment before the protocol conversion based on the correspondence, upon detecting the missing after the protocol conversion.

5. The method of controlling header compression in wireless communication according to claim 1, the method further comprising:

attaching, at the transmitter, a sequence number and flag information indicating whether the header compression state is a compressed or uncompressed state to each of the data segments addressed to the wireless terminal;

determining, at the wireless base station, the sequence number and the header compression state of the missing data segment by monitoring the sequence numbers and the flag information of the data segments received from the transmitter;

performing the missing notification to the transmitter only if the header compression state of the missing data segment is an uncompressed state; and the controlling, at the transmitter, controls the header compression states of the subsequent data segments addressed to the wireless terminal into an uncompressed state when receiving the missing notification from the wireless base station.

6. The method of controlling header compression in wireless communication according to claim 1, wherein the wireless base station performs the missing notification to the transmitter by attaching the missing notification information to the data segment received from the wireless terminal and addressed to the transmitter.

7. The method of controlling header compression in wireless communication according to claim 1, wherein the wireless base station performs the missing notification to the transmitter by generating a data segment to which the missing notification is attached and transmitting the data segments to the transmitter.

8. The method of controlling header compression in wireless communication according to claim 1, wherein the wireless base station performs the missing notification by attaching the missing notification information to the data segment if a data segment received from the wireless terminal and addressed to the transmitter is present, or by generating a data segment to which the missing notification information is attached and transmitting the data segment to the transmitter if the data segment addressed to the transmitter is not present, on the occasion of the transmission of the notification to the transmitter.

9. A wireless base station in a wireless communication system including a transmitter that transmits data segments after controlling header compression states of the data segments addressed to the wireless terminal into a compressed or uncompressed state, a wireless base station that receives the data segments addressed from the transmitter to the wireless terminal and transmits the data segments to the wireless terminal, wherein the wireless terminal decodes the header-compressed data segment transmitted from the wireless base station based on the received header-uncompressed data segment, the wireless base station comprising:

a detector that detects the missing of a data segment from the transmitter and determines a header compression state of the missing data segment; and a controller that sends the missing notification to the transmitter only if the determined header compression state is an uncompressed state.

10. The wireless base station according to claim 9, wherein the detector detects the missing of the data segment by monitoring the sequence numbers of the data segments attached by the transmitter, and the controller notifies the sequence number of the missing data segment to the transmitter, together with the missing notification.

11. The wireless base station according to claim 10, wherein the controller includes a manager that manages the correspondence of the sequence numbers before and after the protocol conversion performed during the transmission of the data segments received from the transmitter to the wireless terminal, and an identifier that identifies the sequence number of the missing data segment before the protocol conversion based on the correspondence, upon detecting the missing after the protocol conversion.

12. The wireless base station according to claim 9, wherein the detector determines the sequence number of the missing data segment and the header compression state of the missing data segment by monitoring the sequence number attached to each of the data segments by the transmitter and the flag information indicating whether the header compression states of the data segments are a compressed or uncompressed state, and the controller performs the missing notification to the transmitter only if the identified header compression state is an uncompressed state.

13. The wireless base station according to claim 9, wherein the controller performs the missing notification to the transmitter by attaching the missing notification information to the data segment received from the wireless terminal and addressed to the transmitter.

14. The wireless base station according to claim 9, wherein the controller performs the missing notification by generating a data segment to which the missing notification information is attached and transmitting the data segments to the transmitter.

15. The wireless base station according to claim 9, wherein the controller performs the missing notification by attaching the missing notification information to the data segment if a data segment received from the wireless terminal and addressed to the transmitter is present, or by generating a data segment to which the missing notification information is attached and transmitting the data segment to the transmitter if the data segment addressed to the transmitter is not present, on the occasion of the transmission of the notification to the transmitter.

16. A transmitter in the wireless communication system including a transmitter that controls header compression states of the data segments addressed to a wireless terminal into a compressed or uncompressed state and that transmits the data segments, a wireless base station that receives the data segments addressed from the transmitter to the wireless terminal and that transmits the data segments to the wireless terminal, and the wireless terminal that decodes the header-compressed data segments transmitted from the wireless base station based on the received header-uncompressed data segment, the transmitter comprising:

a receiver that receives the missing notification transmitted from the wireless base station when the wireless base station detects the missing of a data segment; and a controller that determines a header compression state of the missing data segment when the receiver receives the missing notification, and controls a header compression state of the subsequent data segment addressed to the wireless terminal into an uncompressed state.

17. The transmitter according to claim 16, wherein the controller includes:

a sequence number attaching unit that attaches a sequence number to each of the data segments addressed to the wireless terminal;

a manager that manages correspondence information that brings the sequence numbers into correspondence with information indicating whether the header compression states of the data segments are a compressed or uncompressed state;

a determination unit that determines the header compression state of the missing data segment based on the sequence number of the missing data segment that is received from the wireless base station together with the missing notification by the receiver, and the correspondence information of the manager, and a header compression controller that controls the subsequent data segments addressed to the wireless terminal into an uncompressed state when the header compression state of the missing data segment is an uncompressed state.

18. The transmitter according to claim 17, wherein the header compression controller does not switch the header compression states of the subsequent data segments addressed to the wireless terminal when the header compression state of the missing data segment is a compressed state, as a result of determination by the determination unit.

19. The transmitter according to claim 16, wherein the controller includes a sequence number and flag attaching unit that attaches a sequence number and flag information indicating whether the header compression state is a compressed or uncompressed state to each of the data segments addressed to the wireless terminal.

* * * * *